(12) United States Patent
Jun et al.

(10) Patent No.: US 10,775,015 B2
(45) Date of Patent: Sep. 15, 2020

(54) LAMP FOR VEHICLE AND VEHICLE

(71) Applicant: ZKW Group GmbH, Wieselburg (AT)

(72) Inventors: Naram Jun, Seoul (KR); Yunhee Kim, Seoul (KR); Yoomin Choi, Seoul (KR)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 16/245,865

(22) Filed: Jan. 11, 2019

(65) Prior Publication Data
US 2019/0219243 A1 Jul. 18, 2019

(30) Foreign Application Priority Data
Jan. 12, 2018 (KR) .................. 10-2018-0004681

(51) Int. Cl.
| | |
|---|---|
| F21S 41/675 | (2018.01) |
| B60Q 1/38 | (2006.01) |
| F21S 43/14 | (2018.01) |
| F21S 43/237 | (2018.01) |
| B60Q 3/80 | (2017.01) |
| F21S 41/30 | (2018.01) |
| F21S 41/20 | (2018.01) |
| F21V 8/00 | (2006.01) |
| B60Q 3/18 | (2017.01) |

(52) U.S. Cl.
CPC .............. *F21S 41/675* (2018.01); *B60Q 1/38* (2013.01); *B60Q 3/18* (2017.02); *F21S 41/28* (2018.01); *F21S 41/30* (2018.01); *F21S 43/14* (2018.01); *F21S 43/237* (2018.01); *G02B 6/0001* (2013.01)

(58) Field of Classification Search
CPC .......... F21S 41/24; F21S 41/675; F21S 41/30; F21S 41/28; B60Q 1/0011; B60Q 3/80; G02B 6/0001; G02B 6/001; G02B 6/0016
See application file for complete search history.

(56) References Cited

U.S. PATENT DOCUMENTS

| | | | | |
|---|---|---|---|---|
| 6,367,957 | B1 * | 4/2002 | Hering ................. | F21S 48/215 362/511 |
| 10,047,924 | B2 * | 8/2018 | Faffelberger ......... | G02B 6/0028 |
| 10,139,074 | B2 * | 11/2018 | Koshiro ................ | G02B 6/001 |
| 2010/0202153 | A1 * | 8/2010 | Schwab ............... | B60Q 1/0041 362/520 |
| 2010/0246200 | A1 * | 9/2010 | Tessnow .............. | G02B 6/0075 362/509 |

FOREIGN PATENT DOCUMENTS

| | | |
|---|---|---|
| DE | 102006059980 | 6/2008 |
| EP | 1033526 | 9/2000 |

(Continued)

OTHER PUBLICATIONS

Extended European Search Report in European Patent Application No. 19151183.1, dated May 16, 2019, 8 pages.

*Primary Examiner* — Mary Ellen Bowman
(74) *Attorney, Agent, or Firm* — Fish & Richardson P.C.

(57) ABSTRACT

A lamp for a vehicle includes a cover lens, a housing that is coupled to the cover lens and that defines a lamp space with the cover lens, a light output unit including a plurality of light generation groups that are arranged in the lamp space in a first direction, and a light guide including a plurality of optical guides that are located inside of the lamp space and that extend in a second direction that defines an angle with respect to the first direction.

17 Claims, 22 Drawing Sheets

(56) References Cited

FOREIGN PATENT DOCUMENTS

| EP | 2824387 | 1/2015 |
| JP | 2014082041 | 5/2014 |
| KR | 1020040049963 | 6/2004 |
| KR | 1020170026569 | 3/2017 |
| WO | WO2016070210 | 5/2016 |
| WO | WO2016163176 | 10/2016 |

\* cited by examiner

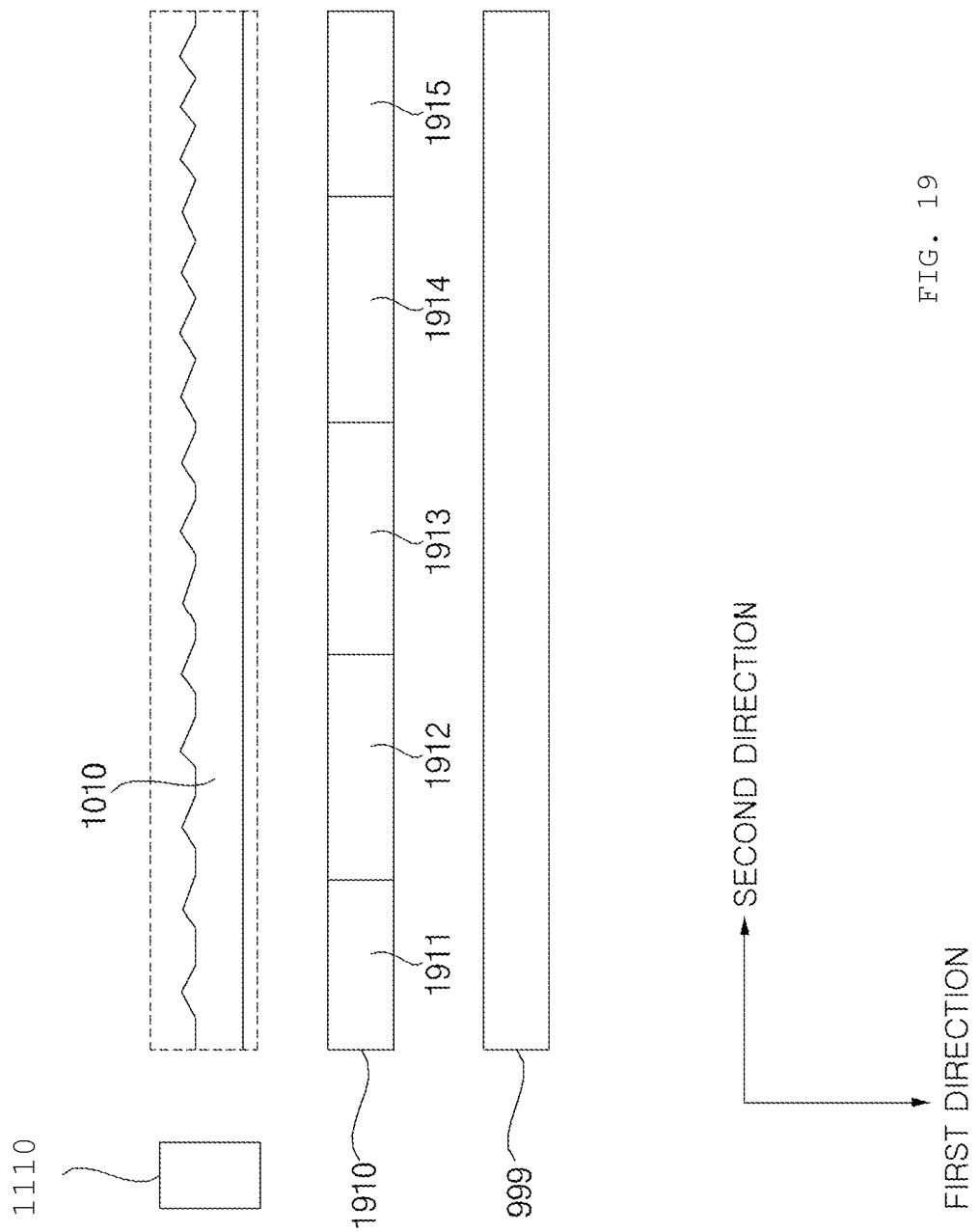

LAMP FOR VEHICLE AND VEHICLE

CROSS-REFERENCE TO RELATED APPLICATION

This application claims the priority benefit of Korean Patent Application No. 10-2018-0004681, filed on Jan. 12, 2018, in the Korean Intellectual Property Office, the disclosure of which is incorporated herein by reference.

FIELD

The present disclosure relates to a lamp for a vehicle, and the vehicle.

BACKGROUND

A vehicle is an apparatus that can transport a user in a direction desired by the user. One example of a vehicle may be an automobile.

A vehicle may include a lamp for securing visibility for a driver (e.g., a head lamp and a fog lamp) and a lamp for notifying a simple signal (e.g., a turn-signal lamp, and a rear combination lamp).

Recently, there is an interest in dynamically outputting light in a specific pattern.

In some cases, a number of components are located within a limited volume in a vehicle, and it is of interest to minimize sizes of vehicle components.

SUMMARY

The present disclosure provides a lamp for a vehicle that occupies a small volume and that dynamically outputs light in one or more patterns.

The present disclosure also provides a vehicle including the lamp.

Objects of the present disclosure should not be limited to the aforementioned objects and other unmentioned objects will be clearly understood by those skilled in the art from the following description.

According to one aspect of the subject matter described in this application, a lamp for a vehicle includes a cover lens, a housing that is coupled to the cover lens and that defines a lamp space with the cover lens, a light output unit including a plurality of light generation groups that are arranged in the lamp space in a first direction, and a light guide including a plurality of optical guides that are located inside of the lamp space and that extend in a second direction that defines an angle with respect to the first direction.

Implementations according to this aspect may include one or more of the following features. For example, each of the plurality of light generation groups may include an array module including one or more micro Light Emitting Diodes (LEDs). In some examples, the plurality of optical guides are configured to be stacked to one another in a direction in which the plurality of light generation groups are disposed. In some cases, a number of the plurality of optical guides corresponds to a number of the plurality of light generation groups. In some examples, each of the plurality of optical guides includes one or more optical patterns defined at different locations in the second direction.

In some implementations, the plurality of optical guides of the light guide include: a first optical guide including a first optical pattern that extends in the second direction; and a second optical guide including a second optical pattern that extends from an end of the first optical pattern in the second direction. In some implementations, each of the one or more optical patterns includes a plurality of protrusions, where sizes of the plurality of protrusions increase based on an increase of a distance between the light output unit and each of the plurality of protrusions.

In some implementations, each of the one or more optical patterns includes a plurality of protrusions, where intervals between adjacent protrusions of the plurality of protrusions decrease based on an increase of a distance between the light output unit and each of the plurality of protrusions. In some implementations, the plurality of optical guides are stacked in the first direction. In some implementations, the light guide defines air gaps between the plurality of optical guides. In some implementations, each of the plurality of optical guides has a constant thickness in the first direction.

In some implementations, each of the plurality of optical guides includes a light absorbing part located at an end of each of the plurality of optical guides. In some implementations, the light guide includes: a first optical guide including a first optical pattern that is spaced apart from the light output unit by a first distance; and a second optical guide including a second optical pattern that is spaced apart from the light output unit by a second distance greater than the first distance, where a distance between the first optical guide and the cover lens is greater than a distance between the second optical guide and the cover lens.

In some implementations, the lamp further includes a bracket configured to support the light guide. In some examples, the bracket includes a partition that surrounds each of the plurality of optical guides. In some implementations, the lamp further includes at least one processor configured to control the light output unit, where the processor is configured to control a sequence and a period of activation of the plurality of light generation groups. In some examples, the processor is configured to, in a state in which at least one of the plurality of light generation groups is turned on, turn on a rest of the plurality of light generation groups sequentially.

In some implementations, the processor is further configured to, in a state in which all of the plurality of light generation groups are turned on, turn off all of the plurality of light generation groups. In some examples, the light output unit is configured to indicate a turn-signal of the lamp.

In some implementations, the first direction corresponds to a forward direction of the vehicle, and the second direction corresponds to a width direction of the vehicle perpendicular to the forward direction.

The details of other implementations are included in the following description and the accompanying drawings.

The implementations of the present disclosure may have one or more of the following effects.

First, for example, a person located outside a vehicle may recognize a signal more accurately when the signal is transmitted using light in a light output pattern.

Second, a small number of light sources may implement a light output pattern, which enables reduction of manufacturing costs.

Third, by minimizing a space occupied by a light output unit, it is possible to minimize an impact to an electronic component.

Effects of the present disclosure should not be limited to the aforementioned effects and other unmentioned effects will be clearly understood by those skilled in the art from the claims.

BRIEF DESCRIPTION OF THE DRAWINGS

The implementations will be described in detail with reference to the following drawings in which like reference numerals refer to like elements.

FIG. 19 is a diagram for explaining an example lamp for a vehicle.

DETAILED DESCRIPTION

Figure 1:
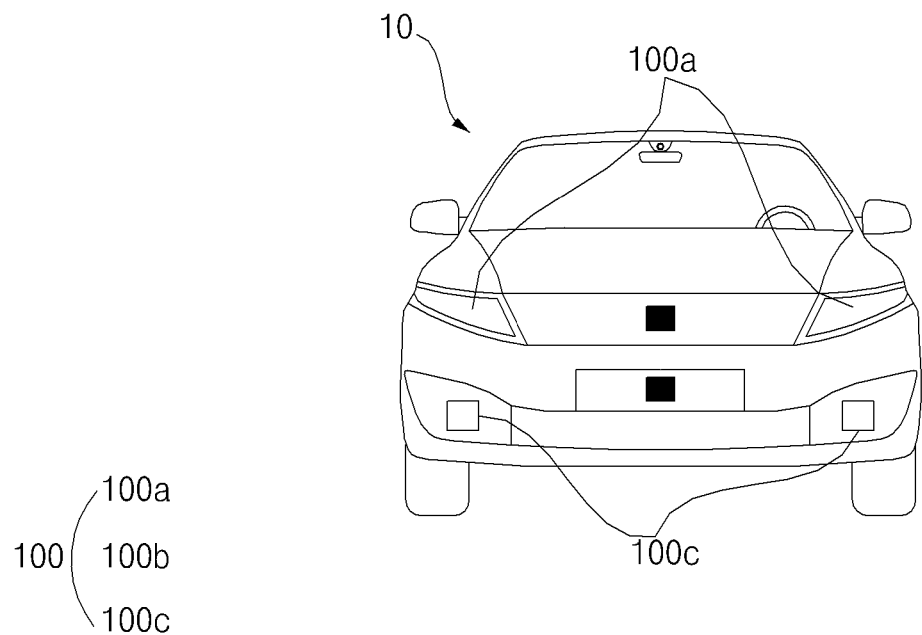
FIG. 1 is a diagram illustrating an example exterior appearance of an example vehicle.
Figure 1:
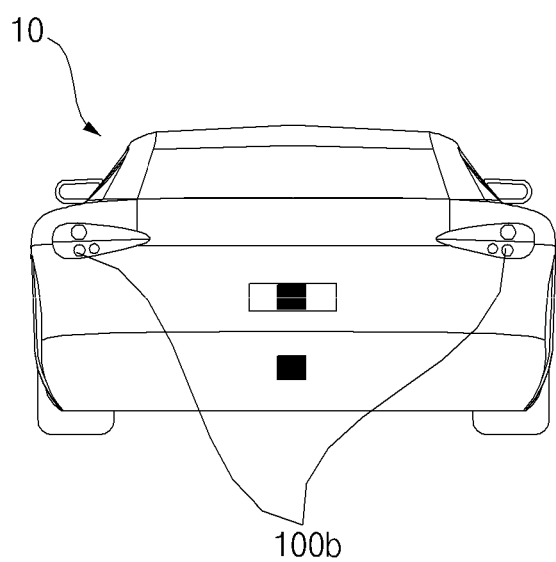

Hereinafter, the implementations disclosed in the present specification will be described in detail with reference to the accompanying drawings, and the same or similar elements are denoted by the same reference numerals even though they are depicted in different drawings and redundant descriptions thereof will be omitted.

A vehicle as described in this specification may include, but not be limited to, an automobile and a motorcycle. Hereinafter, a description will be given based on an automobile.

A vehicle as described in this specification may include one or more of an internal combustion engine vehicle including an engine as a power source, a hybrid vehicle including both an engine and an electric motor as a power source, or an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

In the following description, an array module 200*m* may include one or more arrays.

The array module 200*m* may include one or more layers, and one array may be disposed on one layer.

FIG. 1 is a diagram illustrating an example exterior appearance of an example vehicle.

Referring to FIG. 1, a vehicle 10 may include a lamp 100.

The lamp 100 may include a head lamp 100*a*, a rear combination lamp 100*b*, and a fog lamp 100*c*.

The lamp 100 may further include a room lamp, a turn signal lamp, a daytime running lamp, a back lamp, a positioning lamp, etc.

In some implementations, the term "overall length" means the length from the front end to the rear end of the vehicle 10, the term "overall width" means the width of the vehicle 10, and the term "overall height" means the height from the bottom of the wheel to the roof. In the following description, the term "overall length direction L" may mean the reference direction for the measurement of the overall length of the vehicle 10, the term "overall width direction W" may mean the reference direction for the measurement of the overall width of the vehicle 10, and the term "overall height direction H" may mean the reference direction for the measurement of the overall height of the vehicle 10.

Figure 2:
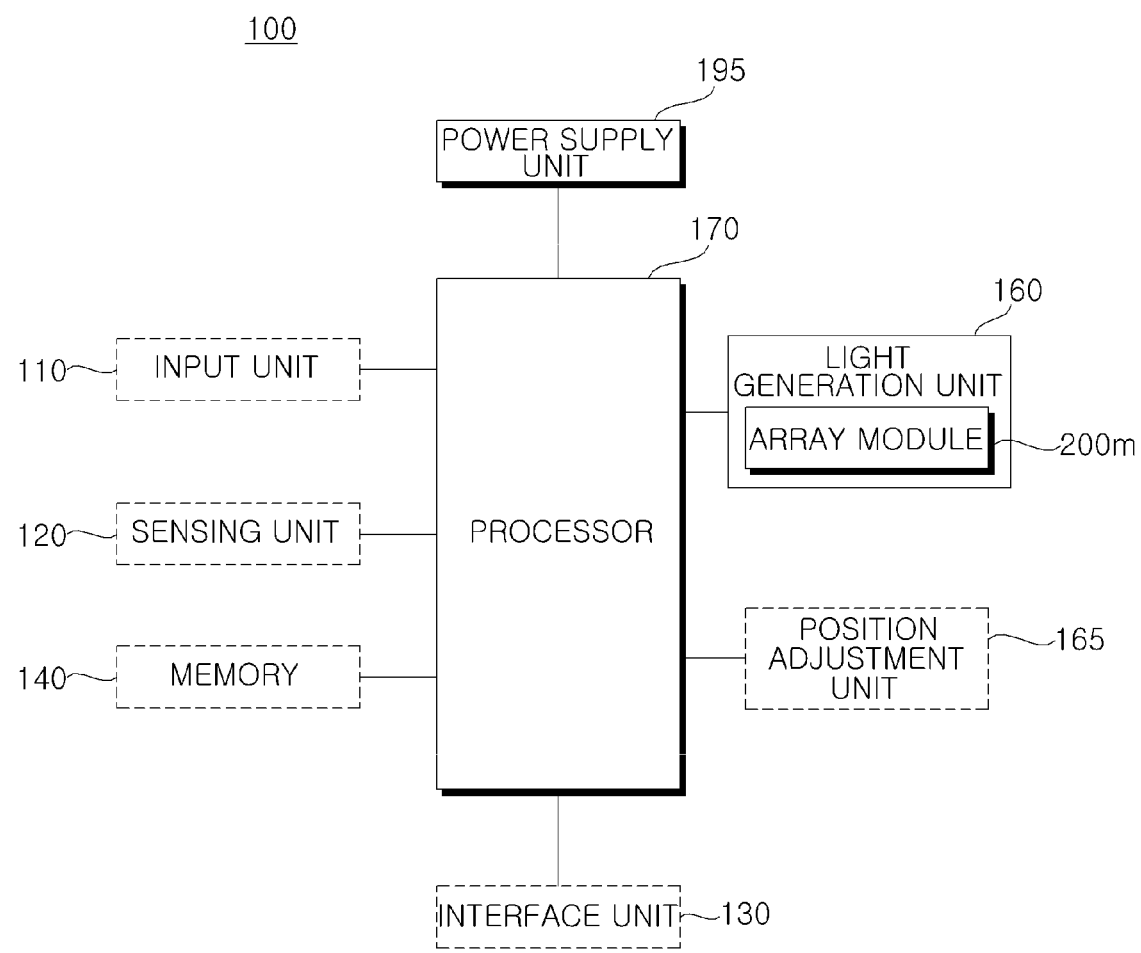
FIG. 2 is a block diagram illustrating an example lamp for a vehicle.

FIG. 2 is a block diagram illustrating an example lamp for a vehicle.

Referring to FIG. 2, the lamp 100 may include a light output unit 160, a processor 170, and a power supply unit 195.

The lamp 100 may further include an input unit 110, a sensing unit 120, an interface unit 130, a memory 140, and a position adjustment unit 165 individually or in combination thereof. In some implementations, the lamp 100 may include one or more processors 170 configured to at least one of the input unit 110, the sensing unit 120, the interface unit 130, the memory 140, the light output unit 160, or the position adjustment unit 165.

The input unit 110 may receive a user input for controlling the lamp 100.

The input unit 110 may include one or more input devices. For example, the input unit 110 may include at least one selected from among a touch input device, a mechanical input device, a gesture input device, and a sound input device.

The input unit 110 may receive a user input for controlling operation of the light output unit 160.

For example, the input unit 110 may receive a user input for turning on or off the light output unit 160.

The sensing unit 120 may include one or more sensors.

For example, the sensing unit 120 may include either or both of a temperature sensor and an illumination sensor.

The sensing unit 120 may acquire temperature information of the light output unit 160.

The sensing unit 120 may acquire illumination information about the outside of the vehicle 10.

The interface unit 130 may exchange information, data, or a signal with another device provided in the vehicle 10.

The interface unit 130 may transmit at least one of information, data, or a signal, received from another device provided in the vehicle 10, to the processor 170.

The interface unit 130 may transmit at least one of information, data, or a signal, generated by the processor 170, to another device provided in the vehicle 10.

The interface unit 130 may receive driving situation information.

The driving situation information may include at least one of the following: information about an object outside the vehicle 10, navigation information, or vehicle state information.

The information about an object outside the vehicle 10 may include the following: information about the presence of the object, information about a location of the object, information about movement of the object, information about a distance between the vehicle 10 and the object, information about a relative speed between the vehicle 10 and the object, and information about a type of the object.

The information about the object may be generated by an object detection apparatus provided in the vehicle 10. The object detection apparatus may detect an object based on sensing data generated by one or more of a camera, a radar, a lidar, an ultrasonic sensor, and an infrared sensor.

The object may include a line, another vehicle, a pedestrian, a two-wheeled vehicle, a traffic sign, light, a road, a structure, a bump, a geographic feature, an animal, etc.

The navigation information may include at least one of the following: map information, information on a set destination, information on a route to the set destination, and information on various object located along the route, lane information, or information on the current location of the vehicle 10.

The navigation information may be generated by a navigation device provided in the vehicle 10.

The vehicle state information may include at least one of the following: vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, or vehicle engine temperature information, among other things.

The vehicle state information may be generated based on sensing information about any of various sensors provided in the vehicle 10.

The memory 140 may store basic data for each unit of the lamp 100, control data for the operational control of each unit of the lamp 100, and input/output data of the lamp 100.

The memory 140 may be any of various hardware storage devices, such as a ROM, a RAM, an EPROM, a flash drive, and a hard drive.

The memory 140 may store various data for the overall operation of the lamp 100, such as programs for the processing or control of the processor 170.

The memory 140 may be classified as a sub-element of the processor 170.

The light output unit 160 may convert electrical energy into light energy under the control of the processor 170.

The light output unit 160 may include an array module 200*m* in which multiple groups of micro Light Emitting Diode (LED) chips are arranged.

The array module 200*m* may be formed flexible.

For example, the array 200 may be formed flexible in a manner such that a Flexible Copper Clad Laminated (FCCL) substrate is disposed on a polyimide (PI) layer and then LED chips each few micrometers (um) are transferred onto the FCCL substrate.

The array module 200*m* may include one or more micro LED arrays 200.

In some implementations, the array module 200*m* may be formed such that a plurality of arrays are stacked on each other.

The multiple groups of micro LED chips may have different shapes.

A micro LED chip may be referred to as a micro LED light emitting device package.

A micro LED chip may include a light emitting device.

A micro LED chip may be of a few micrometers (um). For example, a micro LED chip may be 5-15 um.

A light emitting device of a micro LED chip may be transferred onto a substrate.

The array 200 may include a substrate, and a unit array in which a plurality of micro LED chips are arranged. In the array, one or more unit arrays may be provided.

The unit array may have any of various shapes.

For example, the unit array may be in the shape of a figure of a predetermined area.

For example, the unit array may be in the shape of a circle, a polygon, a fan, etc.

It is desirable that the substrate include an FCCL substrate.

For example, a base 911 (see FIG. 5) and a first electrode 912 (see FIG. 5) may make up the substrate.

For example, a base 911 (see FIG. 8) and a second anode 912*b* (see FIG. 8) may make up a substrate.

In some implementations, the array module 200*m* may function as a surface light source.

The position adjustment unit 165 may adjust position of the light output unit 160.

The position adjustment unit 165 may control the light output unit 160 to be tilted. Due to the tilting control of the light output unit 160, an output light may be adjusted in an upward-downward direction (e.g., an overall height direction).

The position adjustment unit 165 may control the light output unit 160 to be panned. Due to the panning control of the light output unit 160, an output light may be adjusted in a left-right direction (e.g., an overall width direction).

The position adjustment unit 165 may further include a driving force generation unit (e.g., a motor, an actuator, and a solenoid) which provides a driving force required to adjust a position of the light output unit 160.

When the light output unit 160 generates a low beam, the position adjustment unit 165 may adjust a position of the light output unit 160 so that the light output unit 160 outputs a light downward further than when generating a high beam.

When the light output unit 160 generates a high beam, the position adjustment unit 165 may adjust a position of the light output unit 160 so that the light output unit 160 outputs a light upward further than when generating a low beam.

The processor 170 may be electrically connected to each unit of the lamp 100. The processor 170 may control overall operation of each unit of the lamp 100.

The processor 170 may control the light output unit 160.

The processor 170 may control the light output unit 160 by adjusting an amount of electrical energy to be supplied to the light output unit 160.

The processor 170 may control the array module 200*m* on the basis of each region.

For example, the processor 170 may control the array module 200*m* on the basis of each region by supplying a different amount of electrical energy to micro LED chips arranged in each region of the array module 200*m*.

The processor 170 may control the array module 200*m* on the basis of each layer.

A plurality of layers in the array module 200*m* may be composed of a plurality of arrays 200.

For example, the processor 170 may control the array module 200*m* on the basis of each layer by supplying a different amount of electrical energy to each layer.

Under the control of the processor 170, the power supply unit 195 may supply electrical energy required to operate each unit of the lamp 100. In particular, the power supply unit 195 may be supplied with power from a battery inside the vehicle 10.

Figure 3A:
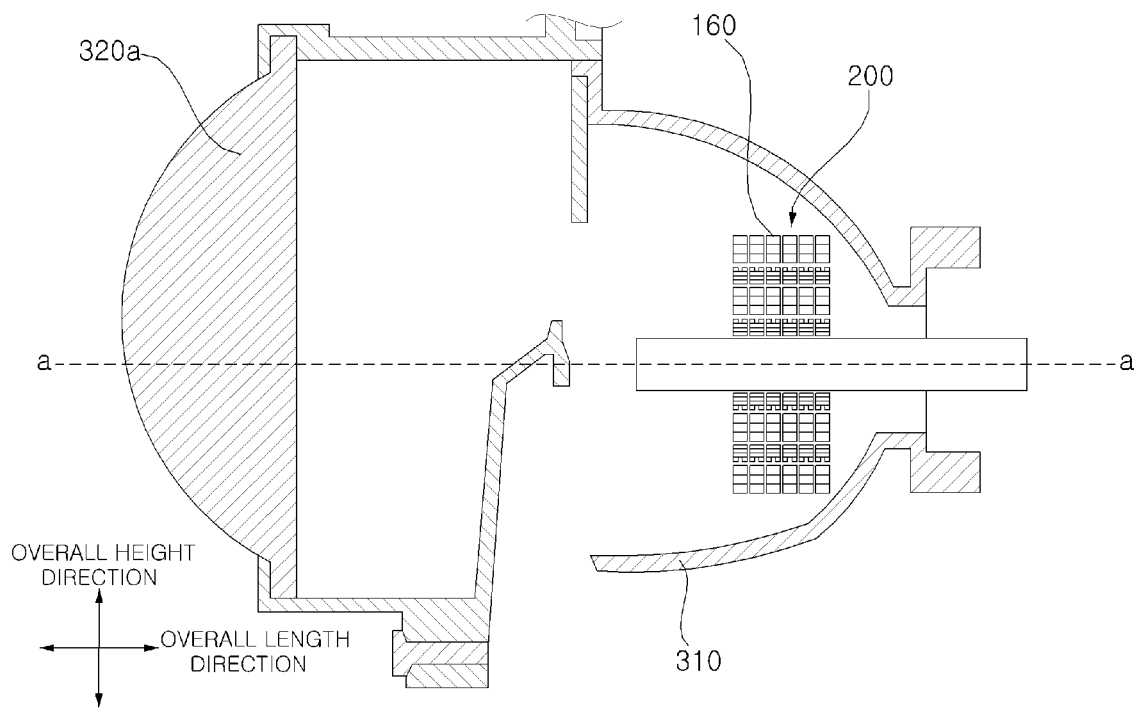
FIGS. 3A to 3C are diagrams illustrating examples of a lamp for a vehicle.
Figure 3B:
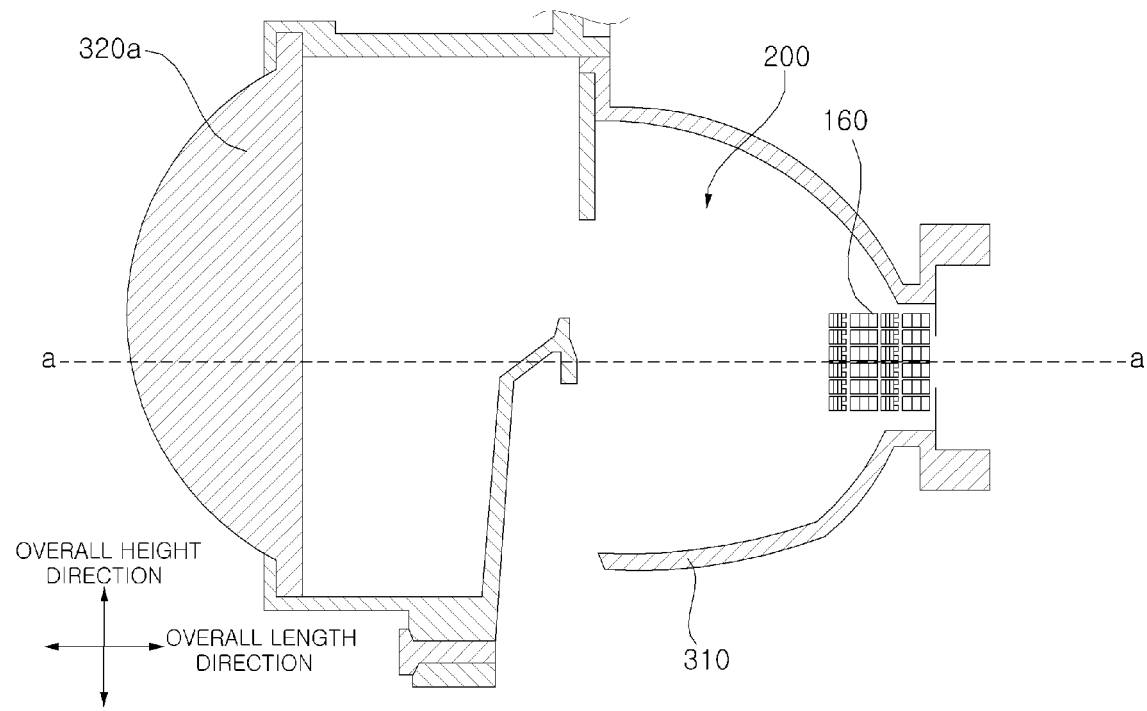
Figure 3C:
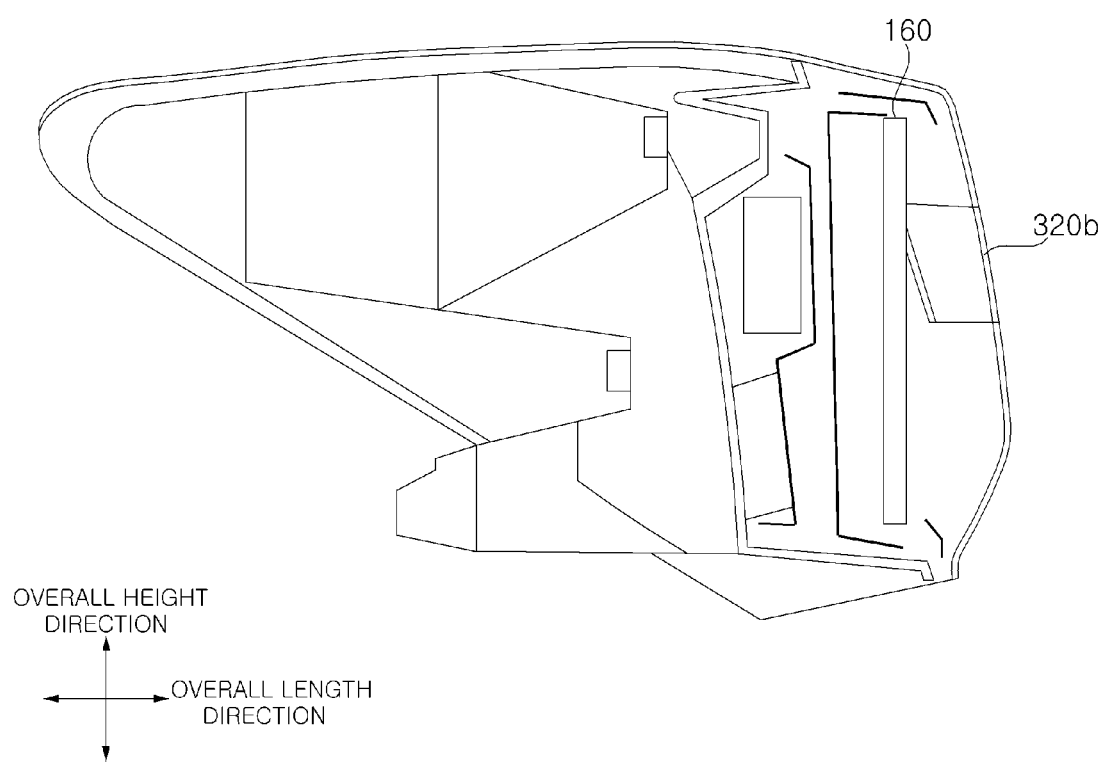

FIGS. 3A to 3C are diagrams illustrating examples of a lamp for a vehicle.

FIGS. 3A and 3B are examples of a section of the lamp 100 implemented as a head lamp 100*a*.

Referring to FIGS. 3A and 3B, the lamp 100 may include a light output unit 160, a reflector 310, and a lens 320*a*.

The reflector 310 may reflect light generated by the light output unit 160. The reflector 310 may guide light to be emitted forward or rearward of the vehicle 10.

The reflector 310 may be formed of a highly reflective material, such as aluminum (AL) and silver (Ag), or may be coated on a reflective surface.

The lens 320a may be disposed before the light output unit 160 and the reflector 310. The lens 320a may refract light generated by the light output unit 160 or light reflected by the reflector 310, and allow the refracted light to pass therethrough. The lens 320a may be an aspheric lens.

The lens 320a may change an optical path of light generated by the light output unit 160.

The lens 320a may be formed of a transparent synthetic resin or glass.

As illustrated in FIG. 3A, the light output unit 160 may output light in an overall height direction.

As illustrated in FIG. 3B, the light output unit 160 may output light in an overall length direction.

FIG. 3C is a diagram illustrating an example lamp for a vehicle.

FIG. 3C is an example of a section of the lamp 100 implemented as a rear combination lamp 200b.

Referring to FIG. 3C, the lamp 100 may include a light output unit 160 and a lens 320b.

The lens 320b may cover the light output unit 160. The lens 320b may refract light generated by the light output unit 160, and allow the refracted light to pass therethrough. The lens 320b may be an aspheric lens.

The lens 320b may change an optical path of light generated by the light output unit 160.

The lens 320b may be formed of a transparent synthetic resin or glass.

Figure 4:
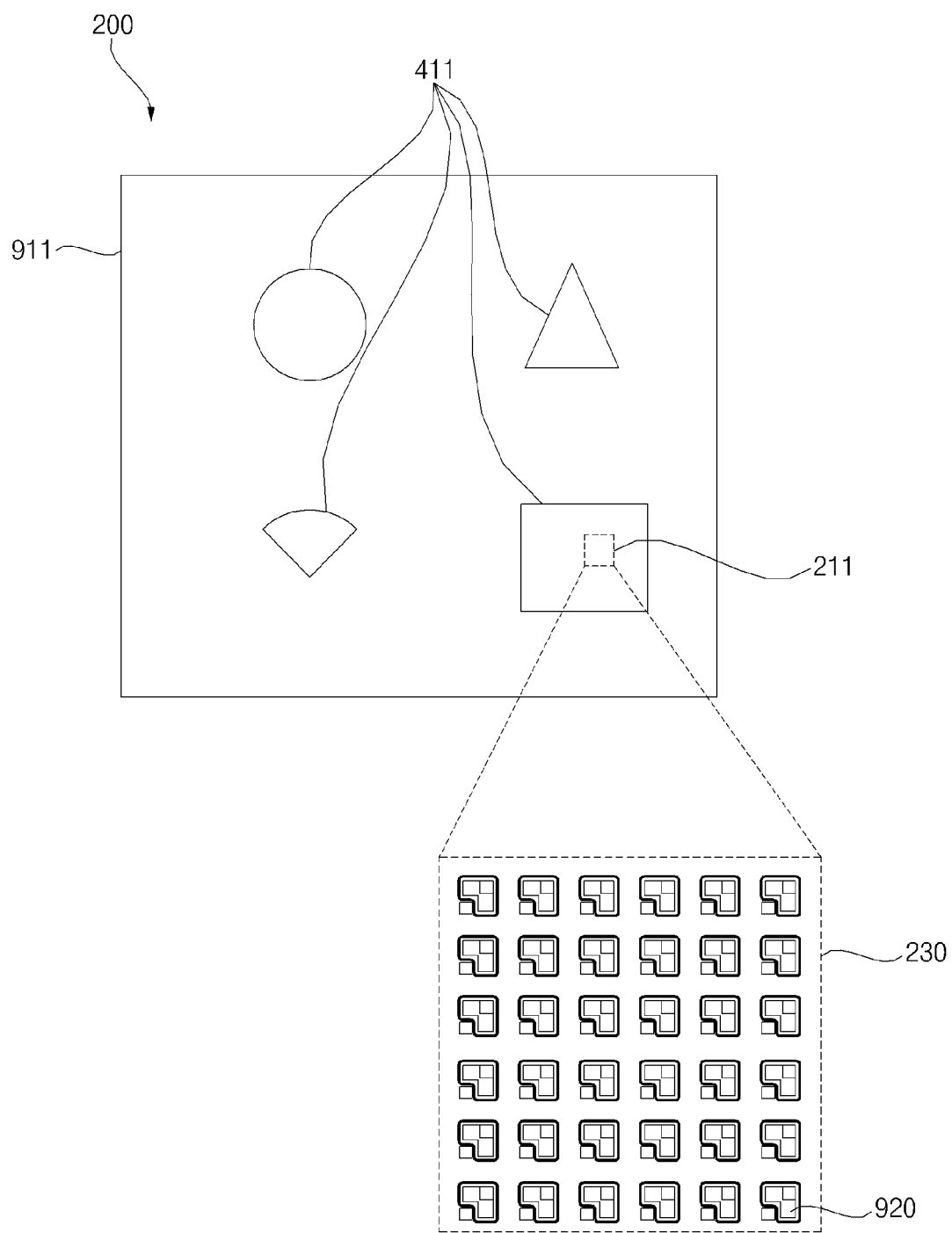
FIG. 4 is a diagram illustrating an example array in which a plurality of micro LED chips is arranged.

FIG. 4 is a diagram illustrating an example array in which a plurality of micro LED chips is arranged.

Referring to FIG. 4, a plurality of micro LED chips 920 may be disposed on an array 200.

The plurality of micro LED chips 920 may be transferred onto the array 200.

Intervals between micro LED chips 920 on the flexible array 200, and a density of micro LED chips 920 (that is, the number of micro LED chips per unit area) on the flexible array 200 may be determined depending on a transfer interval.

The array 200 may include a plurality of unit arrays 411 in which different groups of micro LED chips are arranged respectively.

The array 200 may include a base 911 and one or more unit arrays 411.

The base 911 may be formed of a material such as a polyimide (PI).

In some implementations, the base 911 may be a concept including a polyimide layer and an FCCL substrate disposed on the polyimide layer.

Each of the unit arrays 411 may be disposed on the base 911.

A plurality of micro LED chips 920 may be disposed on each of the unit arrays 411.

The unit arrays 411 may be made by cutting a main array that is an FCCL substrate on which a plurality of micro LED chips 920 is disposed.

In this case, the shape of each unit array 411 may be determined by a shape into which the main array is cut.

For example, each of the unit arrays 411 may have the shape of a two-dimensional figure (e.g., a circle, a polygon, and a fan).

Figure 5:
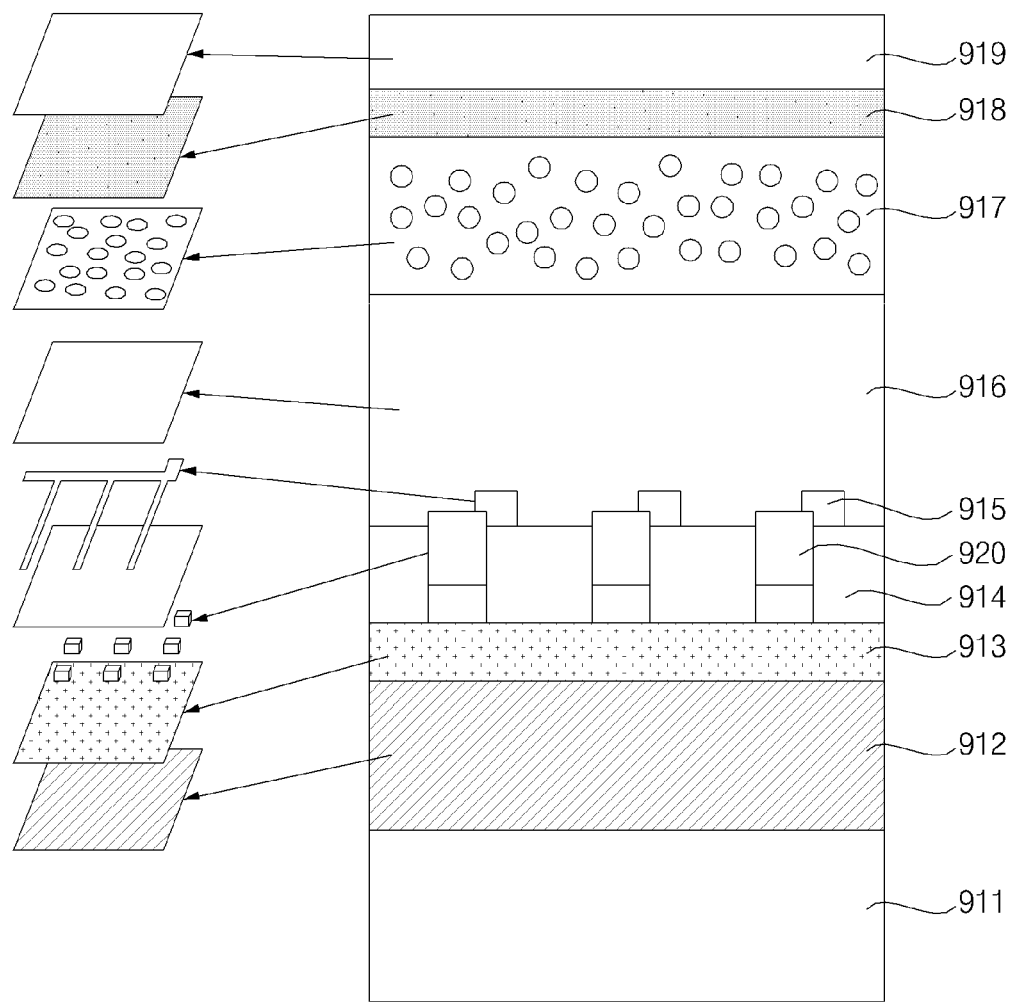
FIG. 5 is a diagram illustrating an example array in which micro LED chips are arranged.

FIG. 5 is a diagram illustrating an example array in which micro LED chips are arranged.

Referring to FIG. 5, the array 200 may include a polyimide layer 911, a FCCL substrate 912, a reflective layer 913, an inter-layer dielectric film 914, a plurality of micro LED chips 920, a second electrode 915, an optical spacer 916, a phosphor layer 917, a color filter film 918, and a cover film 919.

The polyimide layer 911 may be formed flexible.

The FCCL substrate 912 may be formed of copper. The FCCL substrate 912 may be referred to as a first electrode.

In some implementations, the polyimide layer 911 may be referred to as a base.

The first electrode and the second electrode may be electrically connected to the plurality of micro LED chips 920 so as to supply power thereto.

The first electrode 912 and the second electrode 915 may be light transmissive electrodes.

The first electrode 912 may be an anode.

The second electrode 915 may be a cathode.

The first electrode 912 and the second electrode 915 may a metal material which is one or a combination of the following: nickel (Ni), platinum (Pt), ruthenium (Ru), iridium (Ir), rhodium (Rh), tantalum (Ta), molybdenum (Mo), titan (Ti), silver (Ag), tungsten (W), copper (Cu), chromium (Cr), palladium (Pd), vanadium (V), cobalt (Co), niobium (Nb), zirconium (Zr), indium tin oxide (ITO), aluminum zinc oxide (AZO) and Indium Zinc Oxide (IZO).

The first electrode 912 may be formed between the polyimide layer 911 and the reflective layer 913.

The second electrode 915 may be formed on the inter-layer dielectric film 914.

The reflective layer 913 may be formed on the FCCL substrate 912. The reflective layer 913 may reflect light generated by the plurality of micro LED chips 920. It is desirable that the reflective layer 913 may be formed of silver Ag.

The inter-layer dielectric film 914 may be formed on the reflective layer 913.

The plurality of micro LED chips 920 may be formed on the FCCL substrate 912. Each of the plurality of micro LED chips 920 may be attached to the reflective layer 913 or the FCCL substrate 912 using a solder material or an Anisotropic Conductive Film (ACF).

In some implementations, a micro LED chip 920 may be an LEC chip of 10-100 μm.

The optical spacer 916 may be formed on the inter-layer dielectric film 914. The optical spacer 916 may be used to keep a distance between the plurality of micro LED chips 920 and the phosphor layer 917, and may be formed of an insulating material.

The phosphor layer 917 may be formed on the optical spacer 916. The phosphor layer 917 may be formed of resin in which a phosphor is evenly distributed. Depending on a wavelength of light emitted from a micro LED chips 920, any one selected from a blue light-emitting phosphor, a blue-green light-emitting phosphor, a green light-emitting phosphor, a yellow-green light-emitting phosphor, a yellow light-emitting phosphor, a yellow-red light-emitting phosphor, an orange light-emitting phosphor, and a red light-emitting phosphor may be applied as the phosphor.

That is, a phosphor may be excited by light of a first color, which is emitted from the micro LED chips 920, to thereby generate light of a second color.

The color filter film 918 may be formed on the phosphor layer 917. The color filter film 918 may realize a specific color for light which has passed the phosphor layer 917. The color filter film 918 may realize at least one or a combination of red (R), green (G), and blue (B).

The cover film 919 may be formed on the color filter film 918. The cover film 919 may protect the array 200.

The cover film 919 may be formed on the color filter film 918. The cover film 919 may protect the array 200.

Figure 6:
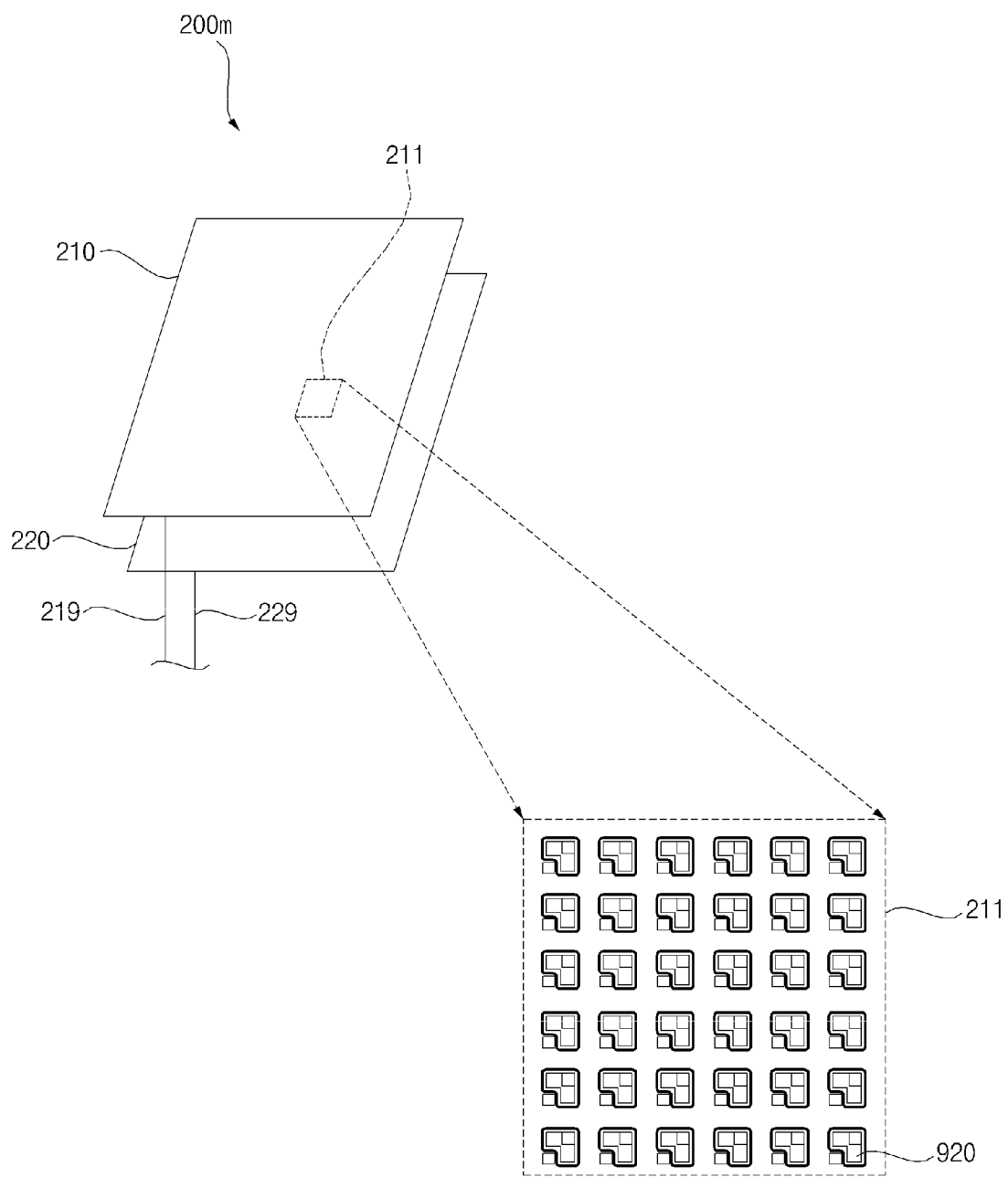
FIG. 6 is a diagram illustrating an example array module.

Referring to FIG. 6, the light output unit 160 may include an array module 200m having a plurality of arrays.

For example, the light output unit 160 may include a first array 210 and a second array 220.

The first array 210 may be different from the second array 220 in terms of at least one of: an interval between a plurality of micro LED chips, positions of the plurality of micro LED chips, or a density of the plurality of micro LED chips.

The second array 220 may be different from the first array 210 in terms of at least one of: an interval between a plurality of micro LED chips, positions of the plurality of micro LED chips, or a density of the plurality of micro LED chips.

The density of the plurality of micro LED chips indicates the number of micro LED chips per unit area.

A first group of micro LED chips may be disposed on the first array 210 in a first pattern.

The first pattern may be determined by at least one of the following: intervals between micro LED chips in the first group, positions of the micro LED chips in the first group on an array module, or a density of the micro LED chips in the first group.

A plurality of micro LED chips included in the first array 210 may be disposed at a first interval.

A plurality of micro LED chips included in the first group may be disposed at the first interval.

The second array 220 may be configured such that the plurality of micro LED chips included in the second group is disposed in a second pattern which is different from the first pattern.

The second pattern may be determined by at least one of the following: intervals between the micro LED chips in the second group, positions of the micro LED chips in the second group, or a density of the micro LED chips in the second group.

The plurality of micro LED chips included in the second array 220 may be disposed at an interval as the same as the interval at which the plurality of micro LED chips included in the first array 210 is disposed.

The plurality of micro LED chips included in the second group may be disposed at an interval as the same as the interval at which the plurality of micro LED chips included in the first group is disposed.

That is, the plurality of LED chips included in the second group may be disposed at the first interval.

The plurality of micro LED chips included in the second group may be disposed not to overlap the plurality of micro LED chips included in the first group in a vertical or horizontal direction.

For example, the first group of micro LED chips may be disposed on the first array 210 not to overlap the second group of micro LED chips, when viewed from above with the first array 210 and the second array 220 overlapping each other.

For example, the second group of micro LED may be disposed on the second array 220 not to overlap the first group of micro LED chips, when viewed from above with the second array 220 and the first array 210 overlapping each other.

Due to such arrangement, it is possible to minimize intervention of the micro LED chips belonging to the first group in output power from the micro LED chips belonging to the second group.

In some implementations, the light output unit 160 may include three or more arrays.

Figure 7A:
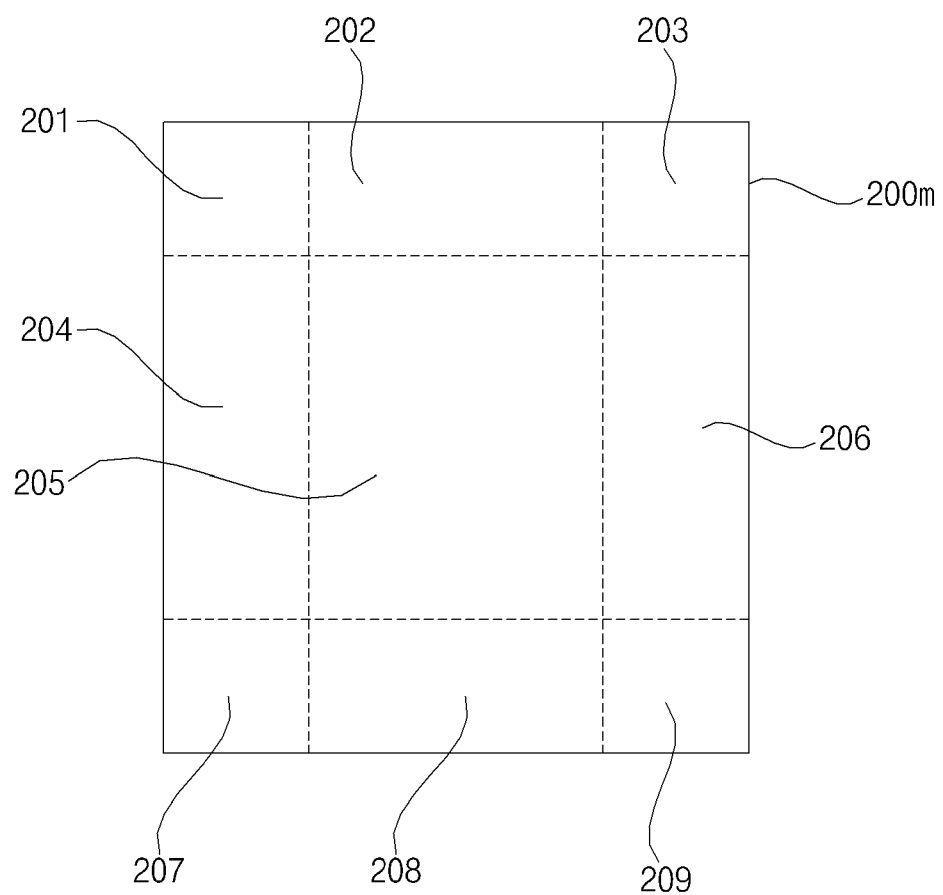
FIG. 7A is an example of a top view of an integrated array module.

FIG. 7A is an example of a top view of an integrated array module.

Figure 7B:
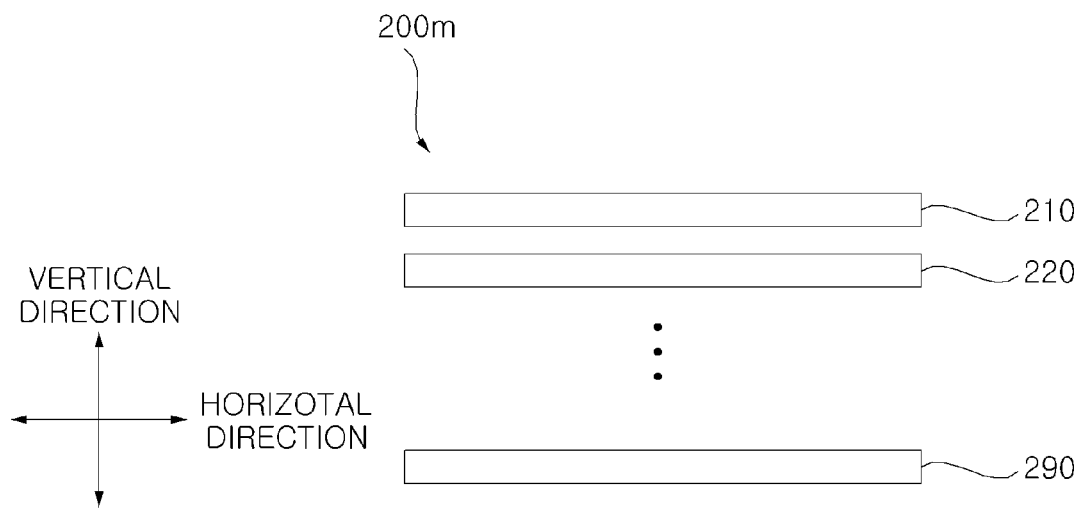
FIG. 7B is an example of a side view of an integrated array module.

FIG. 7B is an example of a side view of an integrated array module.

Referring to FIGS. 7A and 7B, the processor 170 may control the array module 200m on the basis of each region (regions 201 to 209).

The processor 170 may adjust a light distribution pattern by controlling the array module 200m on the basis of each region.

The array module 200m may be divided into a plurality of regions 201 to 209.

The processor 270 may adjust an amount of electrical energy to be supplied to each of the plurality of regions 201 to 209.

The processor 170 may control the array module 200m on the basis of each layer.

The processor 270 may adjust an amount of output light by controlling the array module 200m on the basis of each layer.

The array module 200m may be composed of a plurality of layers. The plurality of layers may be composed of a plurality of arrays, respectively.

For example, a first layer of the array module 200m may be formed by a first array, and a second layer of the array module 200m may be formed by a second array.

The processor 270 may adjust an amount of electrical energy to be supplied to each of the plurality of layers.

Figure 8:
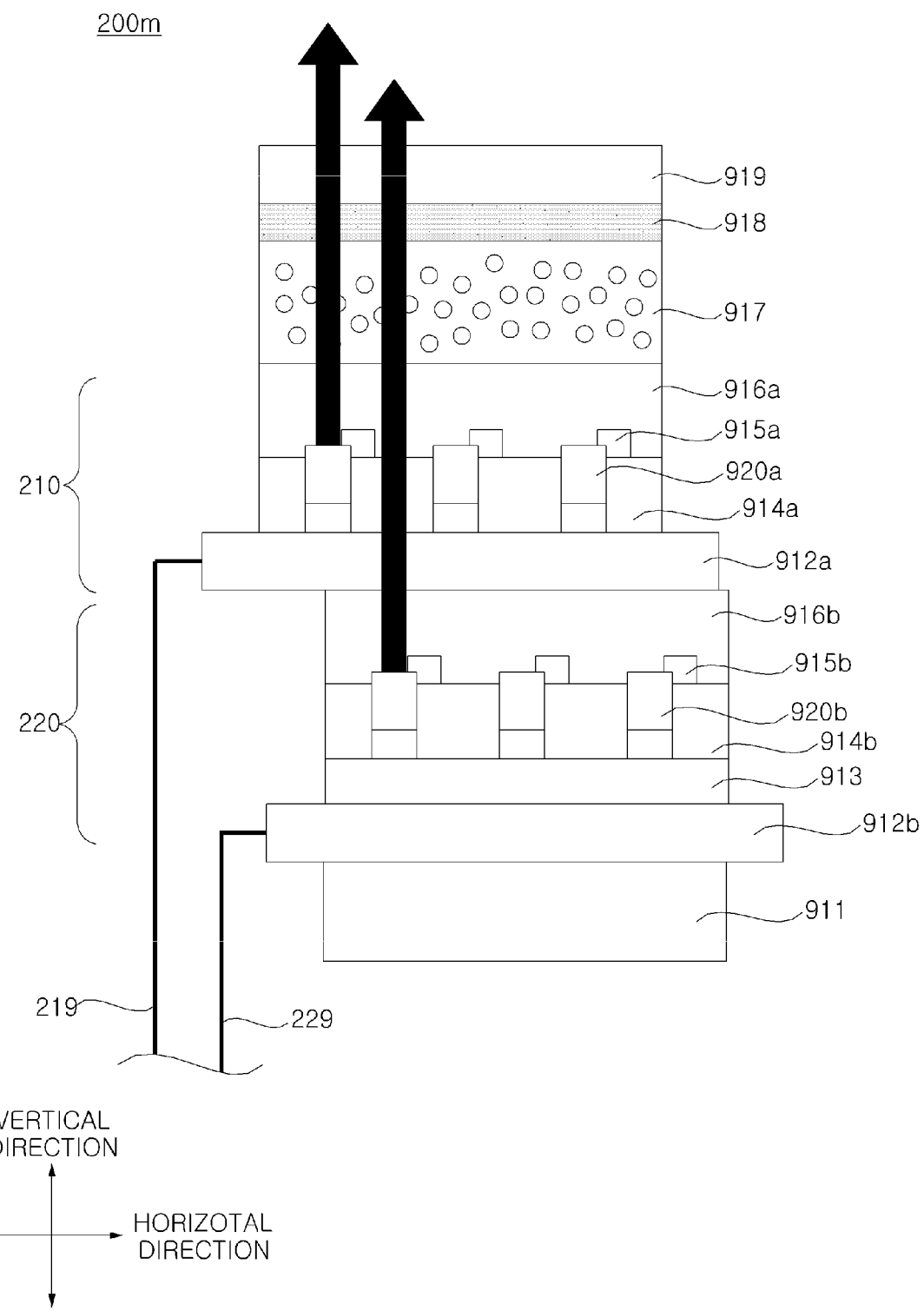
FIG. 8 is a diagram illustrating an example array module in which a plurality of micro LED chips is arranged.

FIG. 8 is a diagram illustrating an example array module in which a plurality of micro LED chips is arranged.

FIG. 8 shows an example in which the array module 200m includes a first array 210 and a second array 220, but the array module 200m may include three or more arrays.

Referring to FIG. 8, the array module 200m may include a polyimide layer 911, the first array 210, and the second array 220.

In some implementations, the array module 200m may further include a phosphor layer 917, a color filter film 918, and a cover film 919 individually or in combination thereof.

The polyimide layer 911 may be flexible.

The second array 220 may be disposed on the base 911.

In some implementations, a layer composed of the polyimide layer 911 or a second anode 912b may be referred to as a base.

In some implementations, the polyimide layer 911 may be referred to as a base.

The second array 220 may be disposed between the first array 210 and the base 911.

The second array 220 may include a second anode 912b, a reflective layer 913, a second inter-layer dielectric film 914b, a second group of micro LED chips 920b, a second optical spacer 916b, and a second cathode 915b.

The second anode 912b may be an FCCL substrate. The second anode 912b may be formed of copper.

The second anode 912b and the second cathode 915b may be light transmissive electrodes.

The second anode 912b and the second cathode 915b may be referred to as transparent electrodes.

The second array 220 may include a transparent electrode.

The second anode 912b and the second cathode 915b may include a metal material which is one or a combination of the following: nickel (Ni), platinum (Pt), ruthenium (Ru), iridium (Ir), rhodium (Rh), tantalum (Ta), molybdenum (Mo), titan (Ti), silver (Ag), tungsten (W), copper (Cu), chromium (Cr), palladium (Pd), vanadium (V), cobalt (Co), niobium (Nb), zirconium (Zr), indium tin oxide (ITO), aluminum zinc oxide (AZO) and Indium Zinc Oxide (IZO).

The second anode 912b may be formed between the base 911 and the reflective layer 913.

The second cathode 915b may be formed on the second inter-layer dielectric film 914b.

The reflective layer 913 may be formed on the second anode 912b. The reflective layer 913 may reflect light generated by the plurality of micro LED chips 920. It is desirable that the reflective layer 913 may be formed of silver Ag.

The second inter-layer dielectric film 914b may be formed on the reflective layer 913.

The second group of micro LED chips 920b may be formed on the second anode 912b. Each micro LED chip 920b belonging to the second group may be attached to the reflective layer 913 or the second anode 912b using a solder material or an Anisotropic Conductive Film (ACF).

The second optical spacer 916b may be formed on the second inter-layer dielectric film 914b. The second optical spacer 916b is used to keep the micro LED chips 920b and the first flexible array 210 at a distance from each other, and the second optical spacer 916b may be made of an insulating material.

The first array 210 may be formed on the second array 220.

The first array 210 may include a first anode 912a, a first inter-layer dielectric film 914a, a first group of micro LED chips 920a, a first optical spacer 916a, and a first cathode 915a.

The first anode 912a may be a FCCL substrate. The first anode 912a may be formed of copper.

The first anode 912a and the first cathode 915a may be light transmissive electrodes.

The first anode 912a and the first cathode 915a may be referred to as transparent electrodes.

The first array 210 may include a transparent electrode.

The first anode 912a and the first cathode 915a may include a metal material which is one or a combination of the following: nickel (Ni), platinum (Pt), ruthenium (Ru), iridium (Ir), rhodium (Rh), tantalum (Ta), molybdenum (Mo), titan (Ti), silver (Ag), tungsten (W), copper (Cu), chromium (Cr), palladium (Pd), vanadium (V), cobalt (Co), niobium (Nb), zirconium (Zr), indium tin oxide (ITO), aluminum zinc oxide (AZO) and Indium Zinc Oxide (IZO).

The first anode 912a may be formed between the second optical spacer 916b and the first inter-layer dielectric film 914a.

The first cathode 915a may be formed on the first inter-layer dielectric film 914a.

The first inter-layer dielectric film 914a may be formed on the first anode 912a.

The first group of micro LED chips 920a may be formed on the first anode 912a. Each micro LED chip 920a belonging to the first group may be attached to the first anode 912a using a solder material or an Anisotropic Conductive Film (ACF).

The first optical spacer 916a may be formed on the first inter-layer dielectric film 914a. The first optical spacer 916a is used to keep a distance between the first group of micro LED chips 920a and the phosphor layer 917, and may be formed of an insulating material.

The phosphor layer 910 may be formed on the first array 210 and the second array 220.

The phosphor layer 917 may be formed on the first optical spacer 916a. The phosphor layer 917 may be formed of resin in which a phosphorus is evenly distributed. Depending on a wavelength of light emitted from the micro LED chips 920a and 920b belonging to the first and second groups, any one selected from a blue light-emitting phosphor, a blue-green light-emitting phosphor, a green light-emitting phosphor, a yellow-green light-emitting phosphor, a yellow light-emitting phosphor, a yellow-red light-emitting phosphor, an orange light-emitting phosphor, and a red light-emitting phosphor may be applied as the phosphor.

The phosphor layer 917 may change a wavelength of lights emitted from first and second micro LED chips 920a and 920b.

The phosphor layer 917 may change a wavelength of a first light generated by the first group of micro LED chips 920a, and a wavelength of a second light generated by the second group of micro LED chips 920b.

The color filter film 918 may be formed on the phosphor layer 917. The color filter film 918 may realize a predetermined color for a light which has passed through the phosphor layer 917. The color filter film 918 may realize at least one or a combination of red (R), green (B), and blue (B).

The cover film 919 may be formed on the color filter film 918. The cover film 919 may protect the array module 200m.

In some implementations, the plurality of micro LED chips 920b included in the second array 220 may be disposed not to overlap the plurality of micro LED chips 920a included in the first array 210 in a vertical or horizontal direction.

The plurality of micro LED chips 920b included in the second group may be disposed not to overlap the plurality of micro LED chips 920a included in the first group in a vertical or horizontal direction.

The vertical direction may be a direction in which the array module 200m is stacked.

The first and second groups of micro LED chips 920a and 920b may output light in the vertical direction.

The horizontal direction may be a direction in which the first and second groups of micro LED chips 920a and 920b are arranged.

The horizontal direction may be a direction in which the base 911, the first and second anodes 912a and 912b, or the phosphor layer 917 extends.

In some implementations, the lamp 100 may further include a wire for supplying power to the array module 200m.

For example, the lamp 100 may include a first wire 219 and a second wire 229.

The first wire 219 may supply power to the first array 210. The first wire 219 may be a pair of wires. The first wire 219 may be connected to the first anode 912a and/or the first cathode 915a.

The second wire 229 may supply power to the second array 220. The second wire 229 may be a pair of wires. The second wire 229 may be connected to the second anode 912b and/or the second cathode 915b.

The first wire 219 and the second wire 229 may be disposed not to overlap each other.

As described above with reference to FIGS. 1 to 8, the lamp 100 may include the array module 200m in which a plurality of micro LED chips is arranged.

Figure 9:
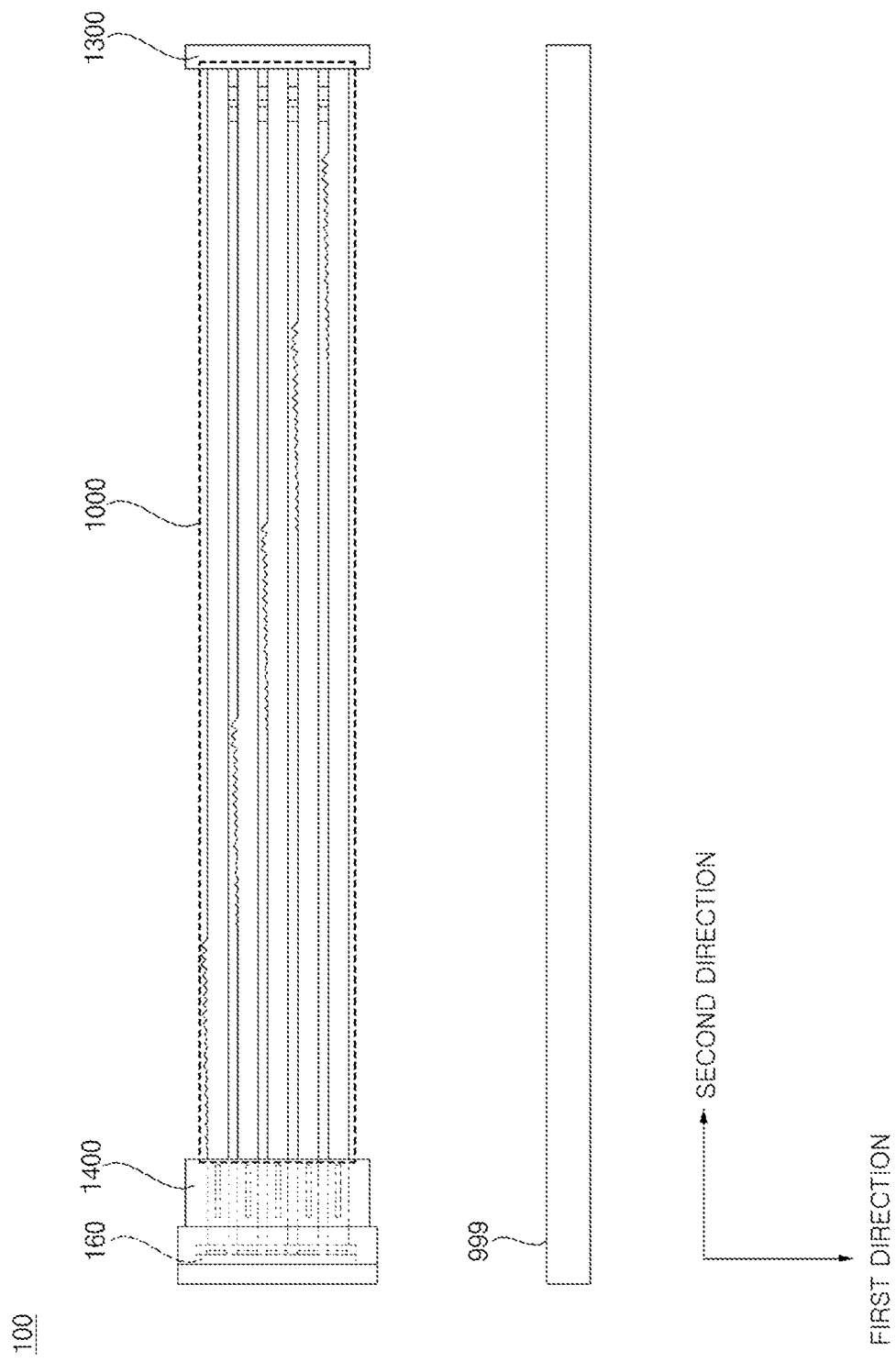
FIG. 9 is a diagram for explaining an example lamp for a vehicle.

FIG. 9 is a diagram for explaining an example lamp for a vehicle.

Referring to FIG. 9, the lamp 100 may include a cover lens 999, a housing, a light output unit 160, and a light guide 1000.

The cover lens 999 may be coupled to the housing to form a space.

The cover lens 999 may be coupled to the housing to accommodate each constituent element of the lamp 100.

The cover lens 999 may protect each constituent element of the lamp 100.

In the space formed by the cover lens 999 and the housing, each constituent element of the lamp 100 may be disposed.

The cover lens 999 may be made of a transparent material to output light to the outside of the vehicle 10.

In some implementations, an optic pattern may be formed on at least part of the cover lens 999.

The cover lens 999 may be referred to as an outer lens.

The housing may be coupled to the cover lens 999 to form a space.

The housing may be coupled to the cover lens 999 to accommodate each constituent element of the lamp 100.

The housing may protect each constituent element of the lamp 100.

In the space formed by the housing and the cover lens 999, each constituent element of the lamp 100 may be disposed.

The housing may be made of a synthetic resin material.

The light output unit 160 may be disposed in the space formed by the cover lens 999 and the housing.

The light output unit 160 may include a plurality of light generation groups.

The plurality of light generation groups may be arranged in a first direction in the space formed by the cover lens 999 and the housing.

The first direction may be defined as a direction in which a straight line is directed within a three-dimensional (3D) space.

For example, the first direction may be defined as the overall length direction of the vehicle, or may be defined as a direction that horizontally forms an angle between 0 degree and 30 degrees relative to the overall length direction.

For example, the first direction may be defined as a heading direction of the vehicle or may be defined as a direction that horizontally defines an angle between 0 degree and 30 degrees relative to the heading direction.

For example, the first direction may be defined as a straight-forward direction of travel of the vehicle, or may be defined as a direction that horizontally defines an angle between 0 degree and 30 degrees relative to the straight-forward direction of travel of the vehicle.

For example, the first direction may be defined as the rearward direction of travel of the vehicle, or may be defined as a direction that horizontally defines an angle of between 0 degree and 30 degrees relative to the rearward direction of travel of the vehicle.

Due to the arrangement of the plurality of light generation groups, only part of the plurality of light generation units are found to see when the lamp 100 is viewed from the front or the rear of the vehicle 10.

The plurality of light generation groups may be arranged in a direction in which a plurality of optical branches included in the light guide 1000 is stacked.

In this case, the direction in which the plurality of optical branches is stacked may be defined as a first direction.

Each of the plurality of light generation groups may include at least one light source that converts electrical energy into light energy.

Each of the plurality of light generation groups may be composed of an array module 200m having a plurality of micro LEDs.

Description about such an array module 200m is the same as described above with reference to FIGS. 1 to 8.

In some implementations, each of the plurality of light generation groups may be composed of at least one from among an incandescent lamp, a halogen lamp, a High Intensity Discharge (HID) lamp, a Light Emitting Diode (LED), and a Laser Diode (LD).

The light output unit 160 will be described in more details with reference to FIG. 10.

The light guide 1000 may guide light generated by the light output unit 160 to the outside of the vehicle 10.

The light guide 1000 may be disposed in a space formed by the cover lens 999 and the housing.

The light guide 1000 may include a plurality of optical branches.

Each of the plurality of optical branches may extend in a second direction within a space formed by the cover lens 9999 and the housing.

The second direction may define a specific angle relative to the first direction. In some examples, the specific angle is predetermined.

The second direction may be defined as a direction in which a straight line is directed within a 3D space.

The second direction may be defined as a direction different from the first direction.

For example, the second direction may be defined as the overall width direction or may be defined as a direction that is horizontally at an angle between 0 degree and 30 degrees relative to the overall width direction.

In one example, the first direction corresponds to a forward direction of the vehicle, and the second direction corresponds to the width direction of the vehicle. In this example, an angle between the second direction and the first direction is 90 degrees.

The light guide 1000 will be described in more details with reference to FIGS. 11 to 15.

Figure 10:
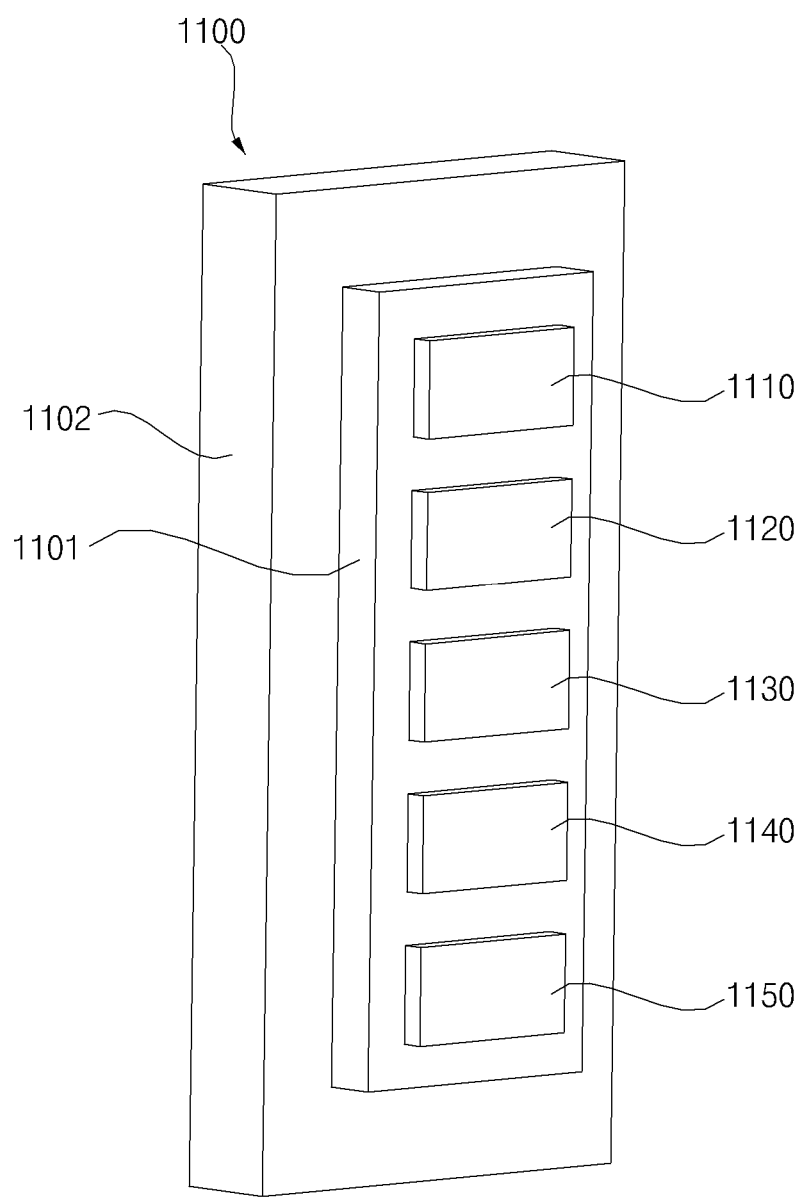
FIG. 10 is a diagram for explaining an example light output unit.

FIG. 10 is a diagram for explaining an example light output unit.

Referring to FIG. 10, the light output unit 160 may include a structure 1100 and a plurality of light generation groups 1110, 1120, 1130, 1140, and 1150.

The structure 1100 may accommodate a circuit board electrically connected to the plurality of light generation groups 1110, 1120, 1130, 1140, and 1150.

The structure 1100 may include a protruding part 1101 and a base 1102.

The protruding part 1101 may protrude from the base 1102 toward the light guide 1000.

The protruding part 1101 may be inserted into the bracket 1400 to couple the bracket 1400 and the structure 1100.

The plurality of light generation groups 1110, 1120, 1130, 1140, and 1150 may be disposed on one surface of the structure 1100.

For example, the plurality of light generation groups 1110, 1120, 1130, 1140, and 1150 may be disposed on one surface of the protruding part 1101.

The plurality of light generation groups 1110, 1120, 1130, 1140, and 1150 may be disposed on one surface of the structure 1100 in a first direction.

Although five light generation groups 1110, 1120, 1130, 1140, and 1150 are illustrated in FIG. 10, they are merely exemplary, and there is no limitation to the number of light generation groups.

FIGS. 11 to 15 are diagrams for explaining examples of a light guide.

Figure 11:
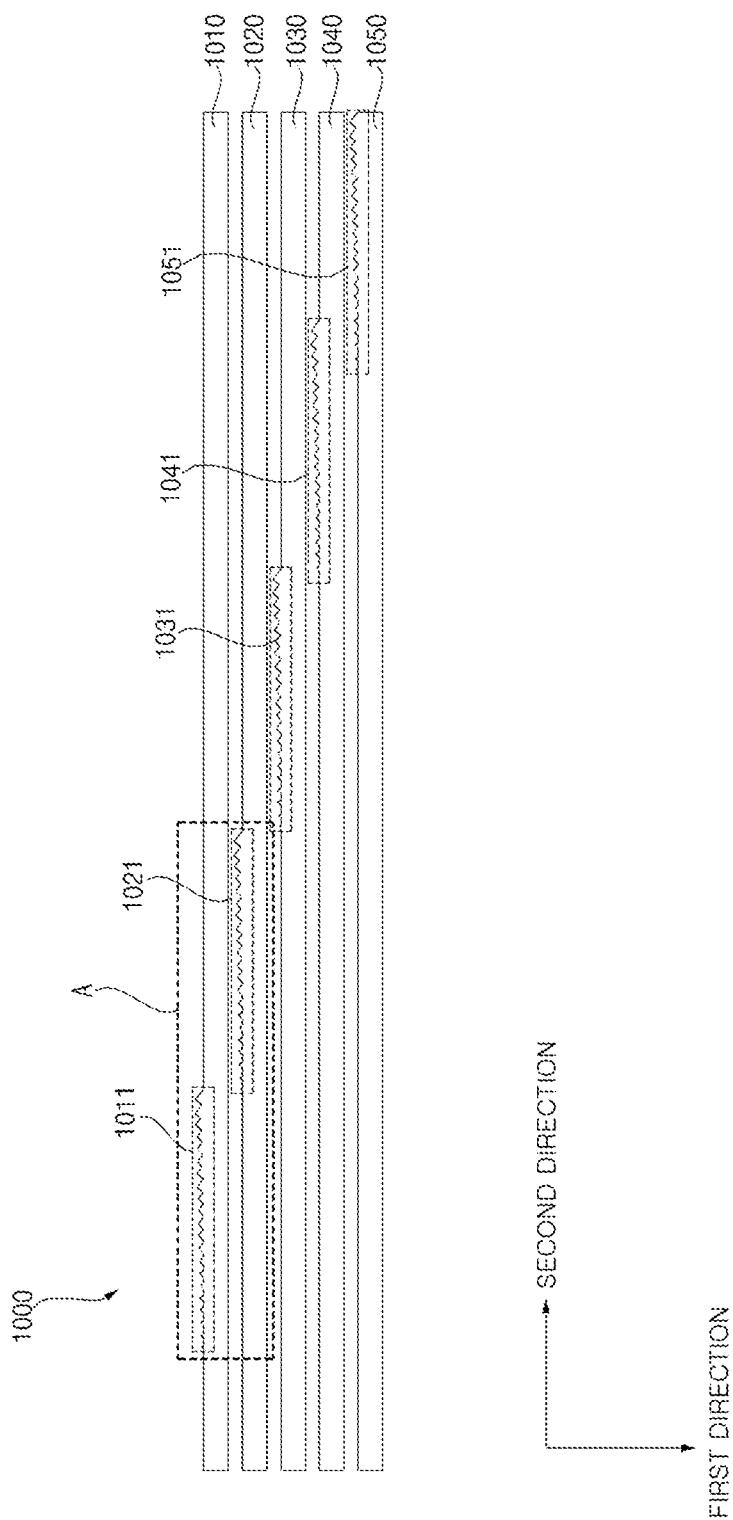
FIGS. 11 to 15 are diagrams for explaining an example light guide.

Referring to FIG. 11, the light guide 1000 may include a plurality of optical branches 1010, 1020, 1030, 1040, and 1050.

The light guide 1000 may include the plurality of optical branches 1010, 1020, 1030, 1040, and 1050, of which the number corresponds to the number of the plurality of light generation groups.

For example, as illustrated in FIG. 10, in the case where five light generation groups 1110, 1120, 1130, 1140, and 1150 are included in the light output unit 160, the light guide 1000 may include five optical branches 1010, 1020, 1030, 1040, and 1050. The optical branches are optical guides configured to guide light in a direction in which the optical branches extend.

The plurality of light generation groups 1110, 1120, 1130, 1140, and 1150 may be disposed to correspond to the plurality of optical branches 1010, 1020, 1030, 1040, and 1050, respectively.

For example, each of the plurality of light generation groups 1110, 1120, 1130, 1140, and 1150 may be disposed to face one end of a corresponding optical branch among the plurality of optical branches 1010, 1020, 1030, 1040, and 1050.

For example, each of the plurality of light generation groups 1110, 1120, 1130, 1140, and 1150 may be accommodated within a corresponding optical branch among the plurality of optical branches 1010, 1020, 1030, 1040, and 1050.

Each of the plurality of optical branches 1010, 1020, 1030, 1040, and 1050 may guide a light generated by a corresponding light generation group among the plurality of light generation groups 1110, 1120, 1130, 1140, and 1150.

For example, a first optical branch 1010 may guide a light generated by a first light generation group 1110.

For example, a second optical branch 1020 may guide a light generated by a second light generation group 1120.

For example, a third optical branch 1030 may guide a light generated by a third light generation group 1130.

For example, a fourth optical branch 1040 may guide a light generated by a fourth light generation group 1140.

For example, a fifth optical branch 1050 may guide a light generated by a fifth light generation group 1150.

Each of the plurality of optical branches 1010, 1020, 1030, 1040, and 1050 may include one or more optic patterns 1011, 1021, 1031, 1041, and 1051 placed at different locations with respect to a second direction.

For example, the first optical branch 1010 may include a first optic pattern 1011 placed at a first position with respect to the second direction.

For example, the second optical branch 1020 may include a second optic pattern 1021 placed at a second position with respect to the second direction.

For example, the third optical branch 1030 may include a third optic pattern 1031 placed at a third position with respect to the second direction.

For example, the fourth optical branch 1040 may include a fourth optic pattern 1041 placed at a fourth position with respect to the second direction.

For example, the fifth optical branch 1050 may include a fifth optic pattern 1051 placed at a fifth position with respect to the second direction.

The plurality of optic patterns 1011, 1021, 1031, 1041, and 1051 may divert a light guided in the second direction toward a first direction.

For example, the plurality of optic patterns 1011, 1021, 1031, 1041, and 1051 may divert a light guided in a longitudinal direction of the plurality of optical branches 1010, 1020, 1030, 1040, and 1050 toward the cover lens 999.

The plurality of optical branches 1010, 1020, 1030, 1040, and 1050 may be stacked in a first direction.

In some implementations, the light guide 1000 may include air gaps between the plurality of optical branches 1010, 1020, 1030, 1040, and 1050.

For example, the light guide 1000 may include a first air gap formed between the first optical branch 1010 and the second optical branch 1020.

For example, the light guide 1000 may include a second air gap formed between the second optical branch 1020 and the third optical branch 1030.

For example, the light guide 1000 may include a third air gap formed between the third optical branch 1030 and the fourth optical branch 1040.

For example, the light guide 1000 may include a fourth air gap formed between the fourth optical branch 1040 and the fifth optical branch 1050.

The air gaps may prevent the plurality of optical branches 1010, 1020, 1030, 1040, and 1050 from interfering with one another with light.

Each of the plurality of optical branches may have a constant thickness.

For example, each of the plurality of optical branches 1010, 1020, 1030, 1040, and 1050 may have a predetermined cross-sectional area in a region other than the optic patterns 1011, 1021, 1031, 1041, and 1051.

In some implementations, each of the plurality of optical branches 1010, 1020, 1030, 1040, and 1050 may include a light absorbing part.

The light absorbing part may be made of a non-reflective material.

In some examples, the light absorbing part may be formed as a non-reflective paint is applied at one end of each of the plurality of optical branches 1010, 1020, 1030, 1040, and 1050.

In some examples, the light absorbing part may be formed as a non-reflective member is attached to one end of each of the plurality of optical branches 1010, 1020, 1030, 1040, and 1050.

Figure 12:
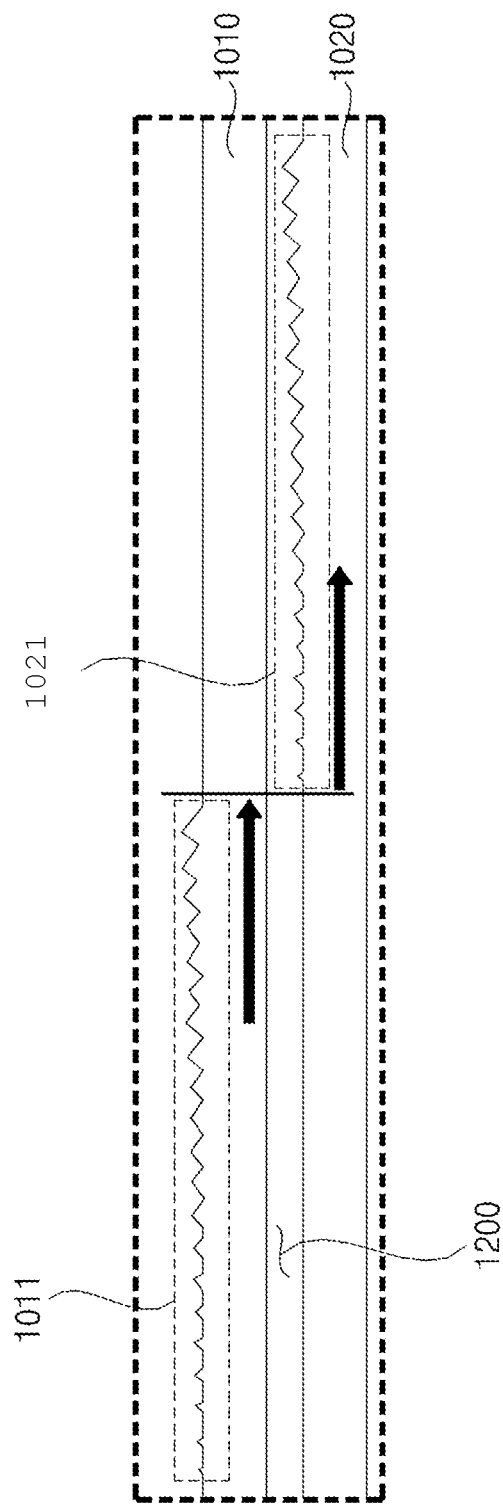

FIG. 12 is an enlarged view of a portion A shown in FIG. 11.

Referring to FIG. 12, the light guide 1000 may include a first optical branch 1010 and a second optical branch 1020.

The first optical branch 1010 may include a first optic pattern 1011 extending in a second direction.

The second optical branch 1020 may include the second optic pattern 1021 extending in the second direction from one end of the first optic pattern 1011.

In some implementations, a first air gap 1200 may be formed between the first optical branch 1010 and the second optical branch 1020.

Figure 13:
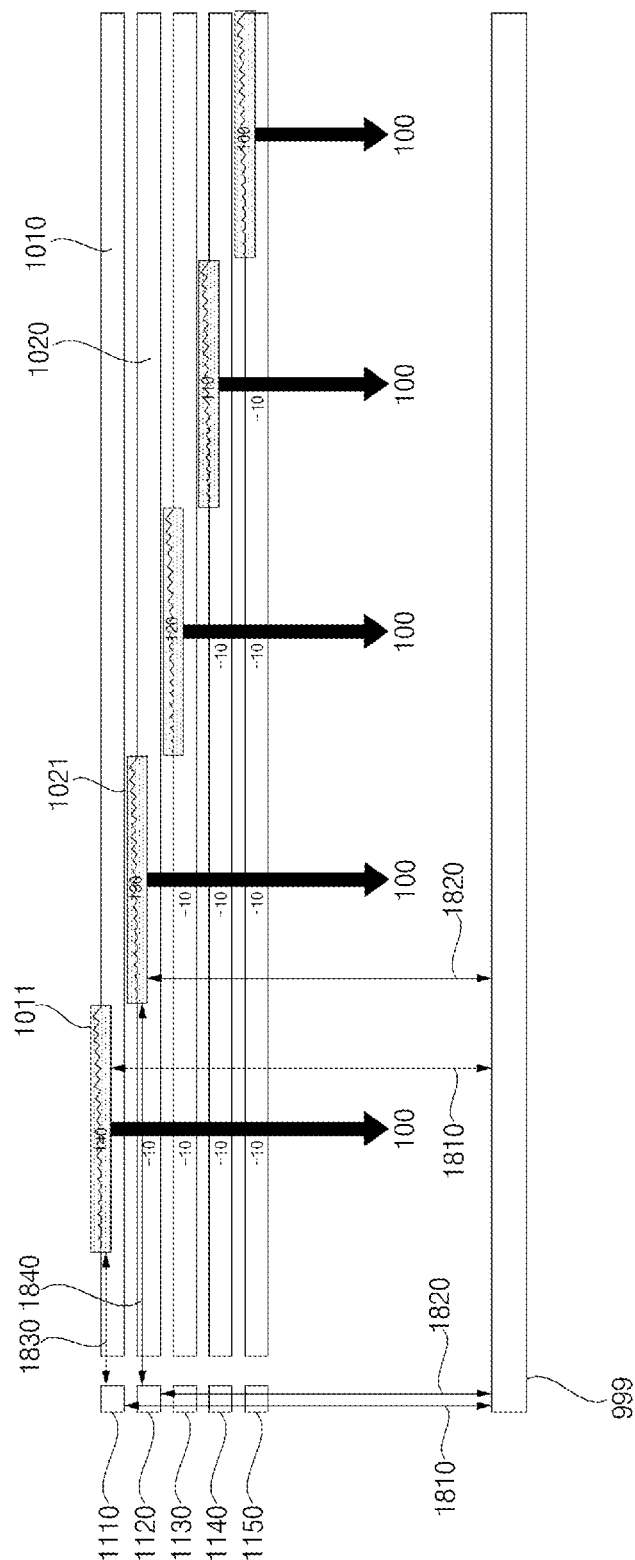

FIG. 13 is a diagram for explaining an example lamp for a vehicle in terms of outputting light.

Referring to FIG. 13, in proportion to a distance each of the plurality of light generating groups may generate a different amount of light.

For example, as each of the plurality of light generation groups 1110, 1120, 1130, 1140, and 1150 is disposed farther from the cover lens, a corresponding light generation group may generate a greater amount of light.

The first light generation group 1110 may be disposed at a first distance 1810 from the cover lens 999.

The second light generation group 1120 may be disposed at a second distance 1820 from the cover lens 999.

The first distance may be greater than the second distance. The second distance may be smaller than the first distance.

A first light generated by the first light generation group 1110 may have a greater quantity than a second light generated by the second light generation group 1120.

As a light guided in a second direction is diverted by an optic pattern toward the cover lens 999, the light passes through a different optical branch.

For example, a first light generated by the first light generation group 1110 and guided in the second direction is diverted by a first optic pattern 1011 toward the cover lens 999. In this case, when the first light whose optical path is changed passes through the second to fifth optical branches 1020, 1030, 1040, and 1050, a loss of light occurs.

In addition, a second light, which is generated by the second light generation group 1120 and then guided in the second direction, is diverted by a second optic pattern 1021 toward the cover lens 999. In this case, as the second light, whose optical path has been changed, passes through the third to fifth optical branches 1030, 1040, and 1050, a loss of light occurs.

That is, as a light generation group is disposed farther from the cover lens 999, a greater loss of light may occur outside the vehicle occurs.

As each of the plurality of light generation groups 1110, 1120, 1130, 1140, and 1150 is disposed farther from the cover lens, a corresponding light generation group may stably output a greater amount of light to the outside.

In some implementations, the light guide 1000 may include a first optical branch 1010 and a second optical branch 1020.

The first optical branch 1010 may be disposed farther from the cover lens 999 than the cover lens 900 is.

The first optical branch 1010 may be disposed at a first distance 1810 from the cover lens 999.

The second optical branch 1020 may be disposed at a second distance 1820 from the cover lens 999.

The first distance 1810 may be greater than the second distance 1820. The second distance 1820 may be smaller than the first distance 1810.

The first optical branch 1010 may include the first optic pattern 1011.

The first optic pattern 1011 may be formed at a third distance from the light output unit 160.

The second optic pattern 1021 may include the second optic pattern 1021 that is disposed away from the light output unit 160 at a distance greater than a distance between the light output unit 160 and the first optic pattern 1011.

The second optical branch 1020 may include the second optic pattern 1021.

The second optic pattern 1021 may be formed at a fourth distance 1840 from the light output unit 160.

The third distance 1830 may be smaller than the fourth distance 1840. The fourth distance 1840 may be greater than the third distance 1830.

Figure 14:
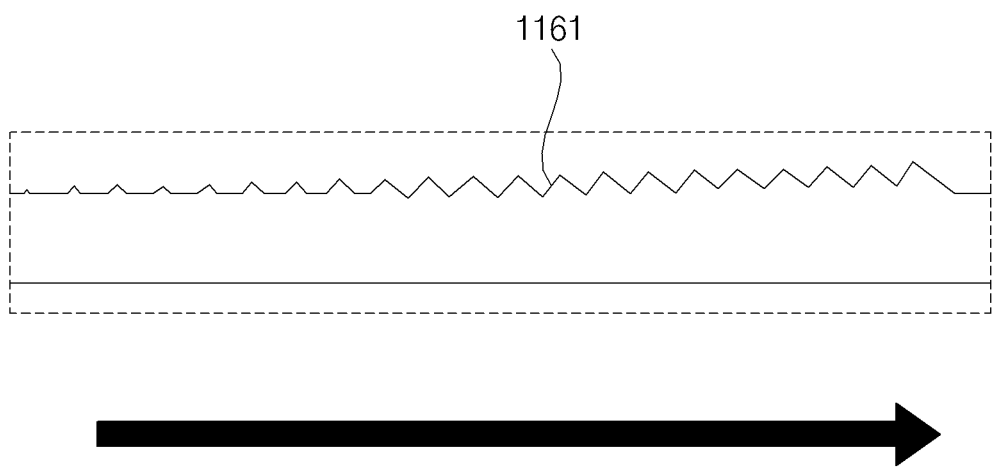
Figure 15:
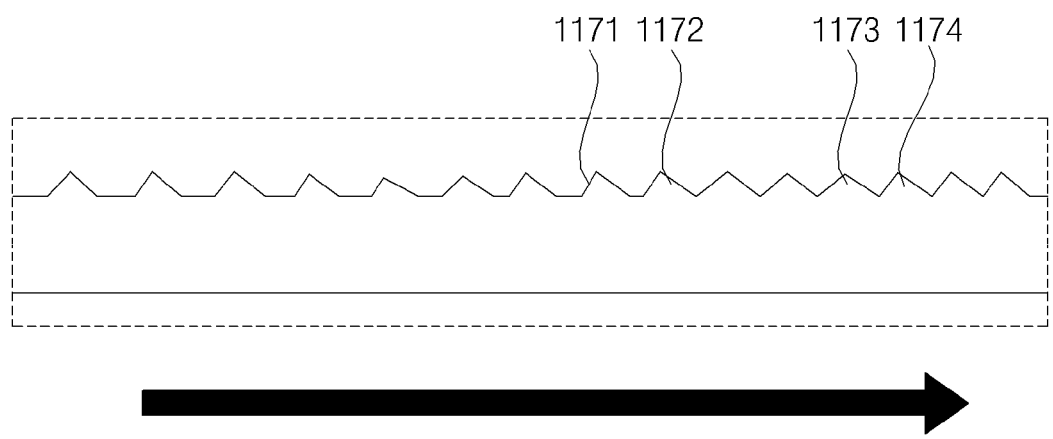

FIGS. 14 and 15 are diagrams illustrating example optic patterns.

Referring to the drawings, each of the plurality of optic patterns 1011, 1021, 1031, 1041, and 1051 may include either or both a plurality of protruding structures and a plurality of recessed structures.

Either or both the plurality of protruding structures and the plurality of recessed structures may be referred to as roughness.

A protruding structure may be formed to protrude from one surface of an optical branch in a direction opposite to the first direction. Such a protruding structure may be referred to as an embossed pattern.

A recessed structure may be formed to be recessed into an optical branch in the first direction. Such a recessed structure may be referred to as a debossed pattern.

As illustrated in FIG. 14, the sizes of the protruding structures 1161 or embossed structures may increase as a distance from the light output unit 160 increases.

As illustrated in FIG. 15, an interval between a plurality of protruding structures included in any one of a plurality of optic patterns may decrease as a distance from the light output unit 160 increases.

For example, an optic pattern may include first to fourth protruding structures 1171, 1172, 1173, and 1174.

The first to fourth protruding structures 1171, 1172, 1173, and 1174 may be placed closer to the light output unit 160 in order named.

The first protruding structure 1171 may be positioned next to the second protruding structure 1172, and the third protruding structure 1173 may be positioned next to the fourth protruding structure 1174.

An interval between the third protruding structure 1173 and the fourth protruding structure 1174 may be smaller than an interval between the first protruding structure 1171 and the second protruding structure 1172.

Due to this structure of the optic pattern, a light generated by each of the plurality of light generation groups may be generated with a minimum light loss.

Figure 16:
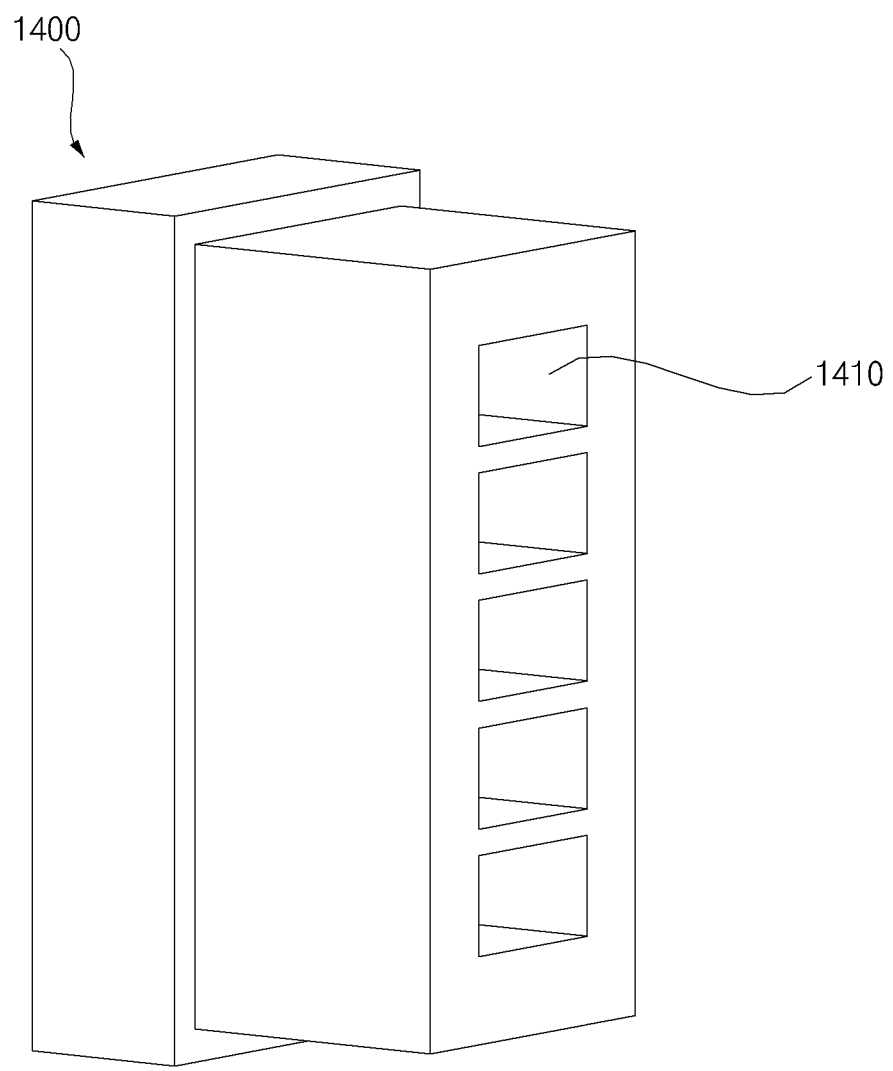
FIG. 16 is a diagram for explaining an example bracket.

FIG. 16 is a diagram for explaining an example bracket.

Referring to FIG. 16, the lamp 100 may further include a bracket 1400.

As a protruding part 1101 is inserted into the bracket 1400 to be fixed thereto, the bracket 1400 and the structure 1100 may be coupled to each other.

The bracket 1400 may support the light guide 1000.

The bracket 1400 may support each of the plurality of optical branches 1010, 1020, 1030, 1040, and 1050.

The bracket 1400 may include a partition 1410.

The partition 1410 may surround each of the plurality of optical branches 1010, 1020, 1030, 1040, and 1050.

The partition 1410 may prevent a light from leaking from the plurality of light generation groups 1110, 1120, 1130, 1140, and 1150 and the plurality of optical branches 1010, 1020, 1030, 1040, and 1050.

Figure 17:
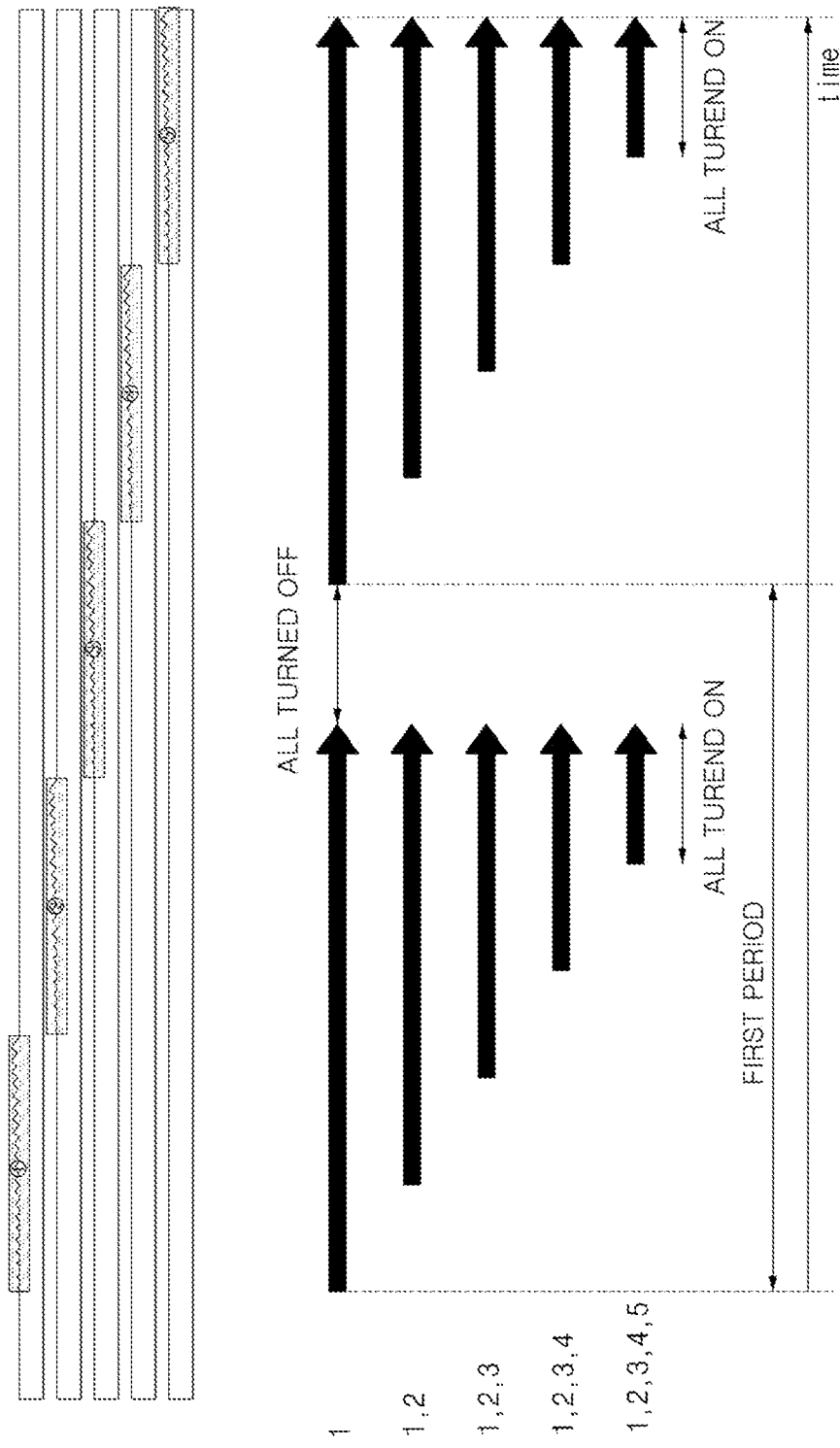
FIGS. 17 and 18 are diagrams illustrating examples of a light output pattern.
Figure 18:
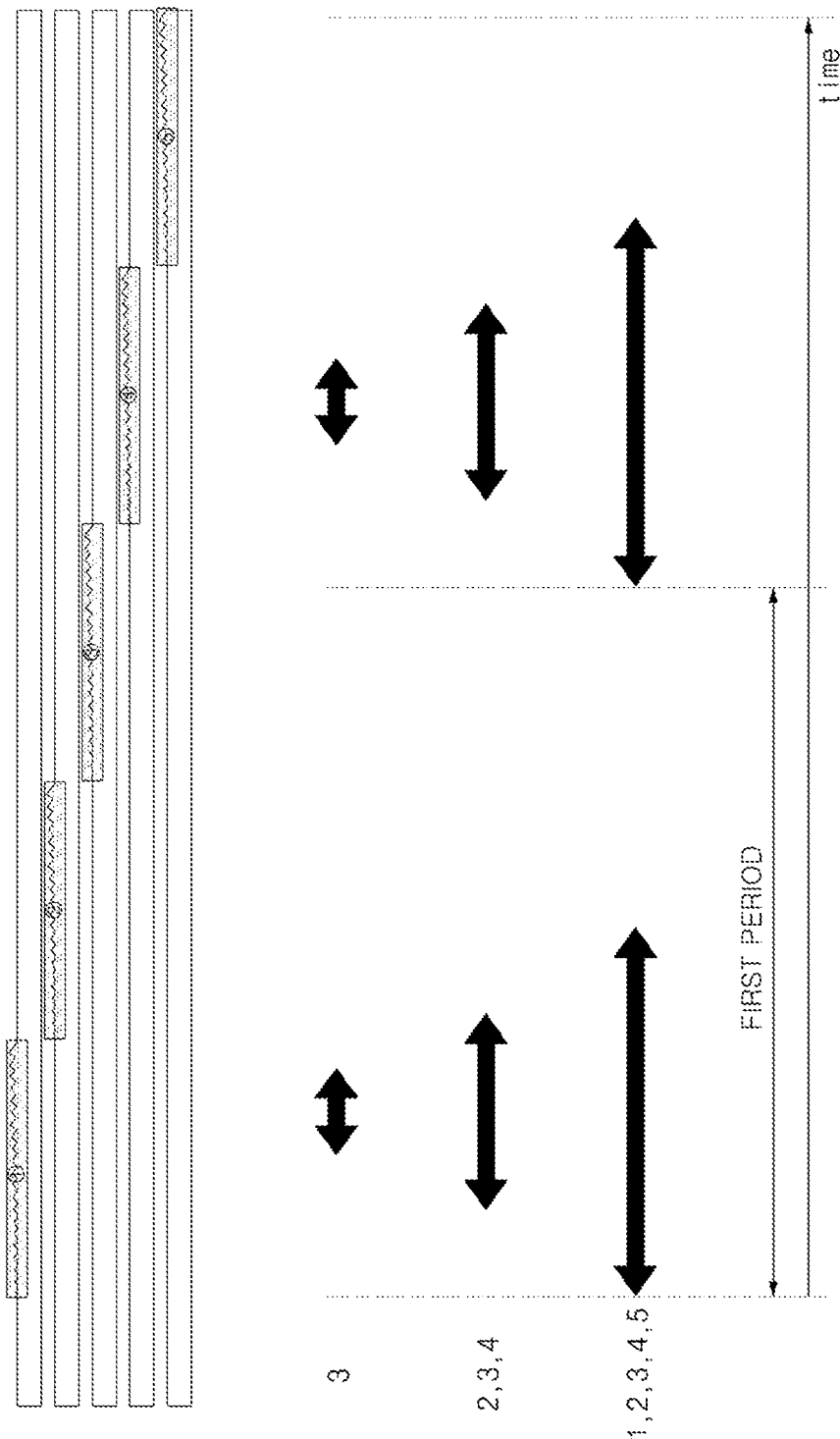

FIGS. 17 and 18 are diagrams illustrating examples of a light output pattern.

The light output unit 160 may function as a turn-signal lamp.

The processor 170 may control the light output unit 160 to perform sequential turn-on operation.

Referring to FIG. 17, the processor 170 may control the light output unit 160.

The processor 170 may control the plurality of light generation groups 1110, 1120, 1130, and 1140 so as to be turned on based on a first sequence within a first period.

For example, while at least one of the plurality of light generation groups included in the light output unit 160 is turned on, the processor 170 may control the rest of the plurality of light generation groups to be turned on sequentially.

For example, while the plurality of light generation groups 1110, 1120, 1130, and 1140 is all turned on, the processor 170 may control the plurality of light generation groups 1110, 1120, 1130, and 1140 to be turned off all at once.

In some implementations, the first period may be defined as a time period from a first time when the plurality of light generation groups 1110, 1120, 1130, and 1140 is all turned off to a second time when the plurality of light generation groups 1110, 1120, 1130, and 1140 is all turned off again.

In some implementations, the first period may be defined as a time period starting at a first time when the plurality of light generation groups 1110, 1120, 1130, and 1140 is all turned on to a second time when the plurality of light generation groups 1110, 1120, 1130, and 1140 is all turned on again.

As illustrated in FIG. 17, the processor 170 may control the plurality of light generation groups 1110, 1120, 1130, 1140, and 1150 based on a first sequence.

The processor 170 may control the first light generation group 1110 to be turned on.

After one hour has elapsed, the processor 170 may control the second light generation group 1120 to be turned on while the first light generation groups 1110 is turned on.

After two hours have elapsed, the processor 170 may control the third light generation group 1130 to be turned on while the first and second light generation groups 1110 1120 are turned on.

After two hours have elapsed, the processor 170 may control the fourth light generation group 1140 to be turned on while the first to third light generation groups 1110, 1120, and 1130 are turned on.

After four hours have elapsed, the processor 170 may control the fifth light generation group 1150 to be turned on while the first to fourth light generation groups 1110, 1120, 1130, and 1140 are turned on.

After five hours has elapsed, the processor 170 may control the first to fifth light generation groups 1110, 1120, 1130, 1140, and 1150 to be turned off all at once from the turned-on state.

Then, the processor 170 may control the plurality of light generation groups 1110, 1120, 1130, 1140, and 1150 based on the first sequence again.

As illustrated in FIG. 18, the processor 170 may control the plurality of light generation groups 1110, 1120, 1130, 1140, and 1150 based on a second sequence.

The processor 170 may control the third light generation group 1130 to be turned on.

After a first time period has elapsed, the processor 170 may control the second to fourth light generation group 1120, 1130, and 1140 while the third light generation group 1130 is turned on.

After a second time period has elapsed, the processor 170 may control the first to fifth light generation groups 1110, 1120, 1130, 1140, and 1150 to be turned on while the second to fourth light generation groups 1120, 1130, and 1140 are turned on.

After a third time period has elapsed, the processor 170 may control the first to fifth light generation groups 1110, 1120, 1130, 1140, and 1150 to be turned off all at once from the turned-on state.

Then, the processor 170 may control the plurality of light generation groups 1110, 1120, 1130, 1140, and 1150 based on the second sequence again.

FIG. 19 is a diagram for explaining an example lamp for a vehicle.

Referring to FIG. 19, the lamp 100 may include a cover lens 999, a housing, a light output unit 160, a light guide 1000, and a filter unit 1910.

The description provided with reference to FIGS. 9 to 18 may be applied to the cover lens 999, the housing, the light output unit 160, and the light guide 1000 shown in FIG. 19.

The light output unit 160 may include one or more light generation groups.

The light guide 1000 may include one or more optical branches.

As illustrated in FIG. 19, the light output unit 160 may include a first light generation group 1110.

The light guide 1000 may include a first optical branch 1010.

The filter unit 1910 may be disposed between the light guide 1000 and the cover lens 999.

The filter unit 1910 may be implemented as a transparent display or an optical filter.

The filter unit 1910 may include a plurality of regions.

For example, the filter unit 1910 may include first to fifth regions 1911, 1912, 1913, 1914, and 1915.

Based on an electrical signal from the processor 170, the filter unit 1910 may transmit or block light for each of the plurality of regions 1911, 1912, 1913, 1914, and 1915.

A first light generated by the first light generation group 1110 may be guided in a second direction by the first optical branch 1010.

A path of the first light may be changed to a first direction by an optic pattern included in the first optical branch 1010. In this case, the first light may be incident on the cover lens 999.

The processor 170 may control the filter unit 1910.

The processor 170 may control the filter unit 1910 so as to transmit or block light for the plurality of regions 1911, 1912, 1913, 1914, and 1915.

The processor 170 may control the filter unit 1910 to perform sequential turn-on operation.

The processor 170 may control the filter unit 1910 so as to output a light based on a first sequence within a first period.

While the first light generation group 1110 is turned on, the processor 170 may control light to be output based on the first sequence by controlling the filter unit 1910.

The processor 170 may control the filter unit 1910 so that a light passes through the first region 1911 but is blocked the light by the second to fifth regions 1912, 1913, 1914, and 1915.

After one hour has elapsed, the processor 170 may control the filter unit 1910 so that a light passes through the first and second regions 1911 and 1912 but is blocked by the third to fifth regions 1913, 1914, and 1915.

After two hours have elapsed, the processor 170 may control the filter unit 1910 so that a light passes through the first to third regions 1911, 1912, and 1913 but is blocked by the fourth and fifth regions 1914 and 1915.

After three hours have elapsed, the processor 170 may control the filter unit 1910 so that a light passes through the first to fourth regions 1911, 1912, 1913, and 1914 but is blocked by the fifth region 1915.

After four hours have elapsed, the processor 170 may control the filter unit 1910 so that a light passes through the first to fifth regions 1911, 1912, 1913, 1914, and 1915.

After five hours has elapsed, the processor 170 may turn off the first light generation group 1110.

The present disclosure as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller. Thus, the above detailed description should not be construed as being limited to the implementations set forth herein in all terms, but should be considered by way of example. The scope of the present disclosure should be determined by the reasonable interpretation of the accompanying claims and all changes in the equivalent range of the present disclosure are intended to be included in the scope of the present disclosure.

Although implementations have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:

1. A lamp for a vehicle, comprising:
   a cover lens;
   a housing that is coupled to the cover lens and that defines a lamp space with the cover lens;
   a light output unit comprising a plurality of light generation groups that are arranged in the lamp space in a first direction; and
   a light guide comprising a plurality of optical guides that are located inside of the lamp space and that extend in a second direction that defines an angle with respect to the first direction,
   wherein a number of the plurality of optical guides correspond to a number of the plurality of light generation groups,
   wherein the plurality of optical guides are stacked in the first direction,
   wherein each of the plurality of optical guides comprises one or more optical patterns defined at different locations in the second direction,
   wherein the optical patterns comprise a first optical pattern of a first optical guide and a second optical pattern of a second optical guide, the first optical pattern extending in the second direction and the second optical pattern extending from one end of the first optical pattern in the second direction,
   wherein each of the plurality of light generation groups generates an amount of light in proportion to its distance from the cover lens, and
   wherein, based on a determination that a light generation group is located farther from the cover lens, the light generation group stably outputs a greater amount of light.

2. The lamp according to claim 1, wherein each of the plurality of light generation groups comprises an array module comprising one or more micro Light Emitting Diodes (LEDs).

3. The lamp according to claim 1, wherein the plurality of optical guides are configured to be stacked to one another in a direction in which the plurality of light generation groups are disposed.

4. The lamp according to claim 1, wherein each of the one or more optical patterns comprises a plurality of protrusions, and
   wherein sizes of the plurality of protrusions increase based on an increase of a distance between the light output unit and each of the plurality of protrusions.

5. The lamp according to claim 1, wherein each of the one or more optical patterns comprises a plurality of protrusions, and
   wherein intervals between adjacent protrusions of the plurality of protrusions decrease based on an increase of a distance between the light output unit and each of the plurality of protrusions.

6. The lamp according to claim 1, wherein the light guide defines air gaps between the plurality of optical guides.

7. The lamp according to claim 1, wherein each of the plurality of optical guides has a constant thickness in the first direction.

8. The lamp according to claim 1, wherein each of the plurality of optical guides comprises a light absorbing part located at an end of each of the plurality of optical guides.

9. The lamp according to claim 1, wherein the light guide comprises:
   a first optical guide comprising a first optical pattern that is spaced apart from the light output unit by a first distance; and
   a second optical guide comprising a second optical pattern that is spaced apart from the light output unit by a second distance greater than the first distance, and
   wherein a distance between the first optical guide and the cover lens is greater than a distance between the second optical guide and the cover lens.

10. The lamp according to claim 1, further comprising a bracket configured to support the light guide.

11. The lamp according to claim 10, wherein the bracket comprises a partition that surrounds each of the plurality of optical guides.

12. The lamp according to claim 1, further comprising at least one processor configured to control the light output unit, wherein the processor is configured to control a sequence and a period of activation of the plurality of light generation groups.

13. The lamp according to claim 12, wherein the processor is configured to, in a state in which at least one of the plurality of light generation groups is turned on, turn on a rest of the plurality of light generation groups sequentially.

14. The lamp according to claim 13, wherein the processor is further configured to, in a state in which all of the plurality of light generation groups are turned on, turn off all of the plurality of light generation groups.

15. The lamp according to claim 1, wherein the light output unit is configured to indicate a turn-signal of the lamp.

16. The lamp according to claim 1, wherein the first direction corresponds to a forward direction of the vehicle, and
   wherein the second direction corresponds to a width direction of the vehicle perpendicular to the forward direction.

17. The lamp according to claim 15, wherein a processor of the vehicle is configured to control the light output unit to perform a sequential turn-on operation.

* * * * *